(12) United States Patent
Diehl et al.

(10) Patent No.: US 7,308,745 B2
(45) Date of Patent: Dec. 18, 2007

(54) METHOD AND DEVICE FOR EDGE-MACHINING OF A PLASTIC OPTICAL LENS AND A COMBINATION TOOL THEREFOR

(75) Inventors: Jochen Diehl, Gießen (DE); Steffen Wallendorf, Gießen Kleinlinden (DE)

(73) Assignee: Satisloh GmbH, Wetzlar (DE)

( * ) Notice: Subject to any disclaimer, the term of this patent is extended or adjusted under 35 U.S.C. 154(b) by 655 days.

(21) Appl. No.: 10/722,007

(22) Filed: Nov. 25, 2003

(65) Prior Publication Data

US 2004/0178528 A1 Sep. 16, 2004

(30) Foreign Application Priority Data

Nov. 25, 2002 (DE) .................. 102 55 058

(51) Int. Cl.
B23B 1/00 (2006.01)
B23B 29/24 (2006.01)
B23C 3/04 (2006.01)
B23C 5/02 (2006.01)

(52) U.S. Cl. ................ 29/50; 29/558; 29/76.1; 29/23.5; 451/461

(58) Field of Classification Search ............. 29/50, 29/558, 76.1, 23.5, 412, 251; 451/11, 42, 451/65, 43, 461, 236
See application file for complete search history.

(56) References Cited

U.S. PATENT DOCUMENTS

| | | | | |
|---|---|---|---|---|
| 2,821,813 | A * | 2/1958 | Degler | 29/76.1 |
| 3,802,064 | A * | 4/1974 | Miller | 29/558 |
| 4,530,139 | A * | 7/1985 | Miller | 29/25.35 |
| 4,550,482 | A * | 11/1985 | Buckley et al. | 29/412 |
| 5,319,324 | A * | 6/1994 | Satoh et al. | 29/25.35 |
| 5,615,588 | A | 4/1997 | Gottschald | |
| 5,626,511 | A * | 5/1997 | Kennedy et al. | 451/461 |
| 5,713,253 | A | 2/1998 | Date et al. | |
| 5,882,247 | A * | 3/1999 | Longuet et al. | 451/236 |
| 5,887,326 | A * | 3/1999 | Bower et al. | 29/251 |
| 6,203,409 | B1 * | 3/2001 | Kennedy et al. | 451/43 |

(Continued)

FOREIGN PATENT DOCUMENTS

DE  291 465 C  4/1916

(Continued)

*Primary Examiner*—Dana Ross
(74) *Attorney, Agent, or Firm*—Reising, Ethington, Barnes, Kisselle, P.C.

(57) ABSTRACT

An edge-machining device in particular plastic spectacle lenses (L) has two aligned holding shafts (14, 16) rotatable with a controlled angle of rotation ($\phi_B$) about a rotational axis of a workpiece (B) between which the lens may be clamped and a tool spindle (12) rotationally drives a combination tool (10) about a rotational axis of a tool (C) running parallel to the rotational axis of the workpiece. The holding shafts and the tool spindle may be moved with position control towards each other in a first axial direction (X) and optionally parallel to each other in a second axial directions (Z) perpendicular to the first axial direction. The combination tool can be swivelled with a controlled angle of rotation ($\phi_C$) about the rotational axis of the tool by means of the tool spindle so that a lathe tool (36) provided on the combination tool may be brought into a defined lathe machining engagement with the edge of the lens. The invention also comprises a combined milling and lathe tool and a combined milling and turning machining method.

20 Claims, 15 Drawing Sheets

U.S. PATENT DOCUMENTS

Figure 2:
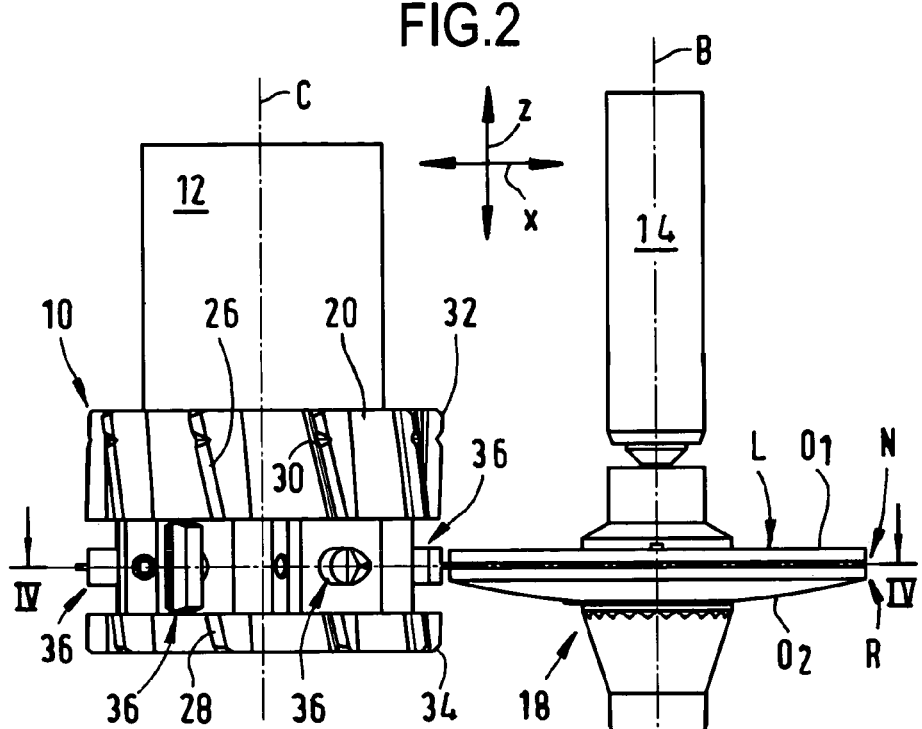

| | | | |
|---|---|---|---|
| 6,623,339 B1 * | 9/2003 | Igarashi et al. | 451/42 |
| 6,712,671 B2 | 3/2004 | Wallendorf | |
| 6,749,377 B2 | 6/2004 | Gottschald et al. | |
| 6,991,525 B2 * | 1/2006 | Diehl et al. | 451/65 |
| 7,137,871 B2 * | 11/2006 | Gottschald et al. | 451/11 |

FOREIGN PATENT DOCUMENTS

| | | |
|---|---|---|
| DE | G 87 11 265.5 | 11/1987 |
| DE | 43 08 800 A1 | 10/1993 |
| DE | 195 25 310 A 1 | 12/1995 |
| DE | 198 34 748 A1 | 2/2000 |
| DE | 201 09 197 U 1 | 10/2002 |
| DE | 101 43 848 A 1 | 3/2003 |
| EP | 0 705 660 A1 | 4/1996 |
| EP | 0 705 660 A 1 | 4/1996 |
| EP | 0 820 837 A1 | 1/1998 |
| EP | 1 166 929 A 1 | 1/2002 |
| EP | 1 238 733 A 1 | 9/2002 |
| JP | 63-105812 | 5/1988 |
| JP | 4-19713 | 2/1992 |

* cited by examiner

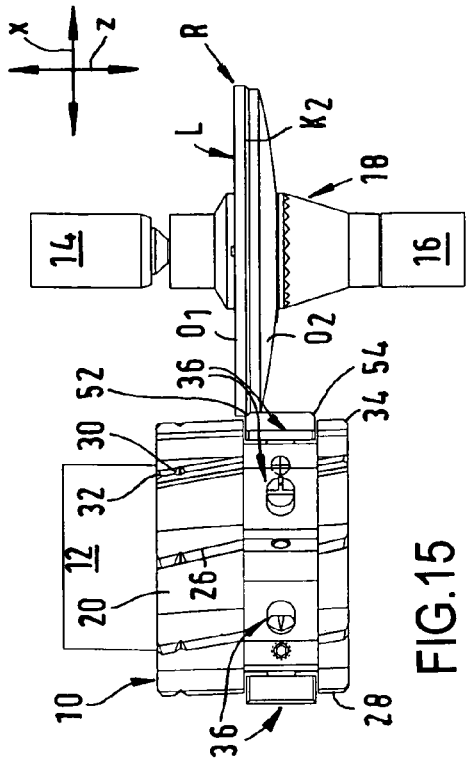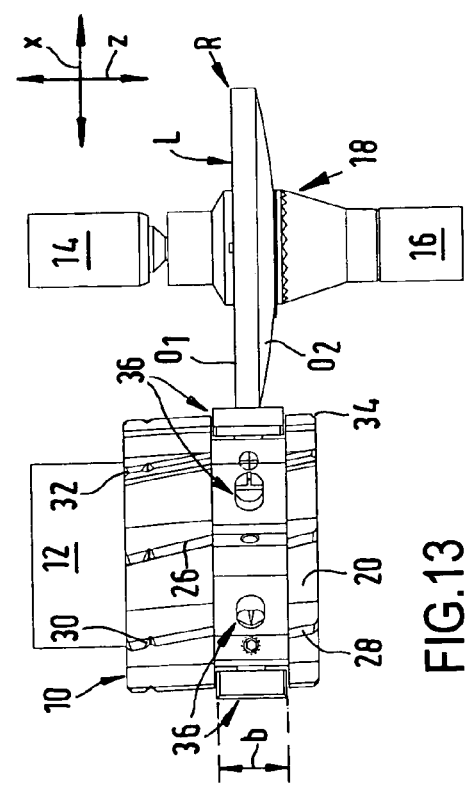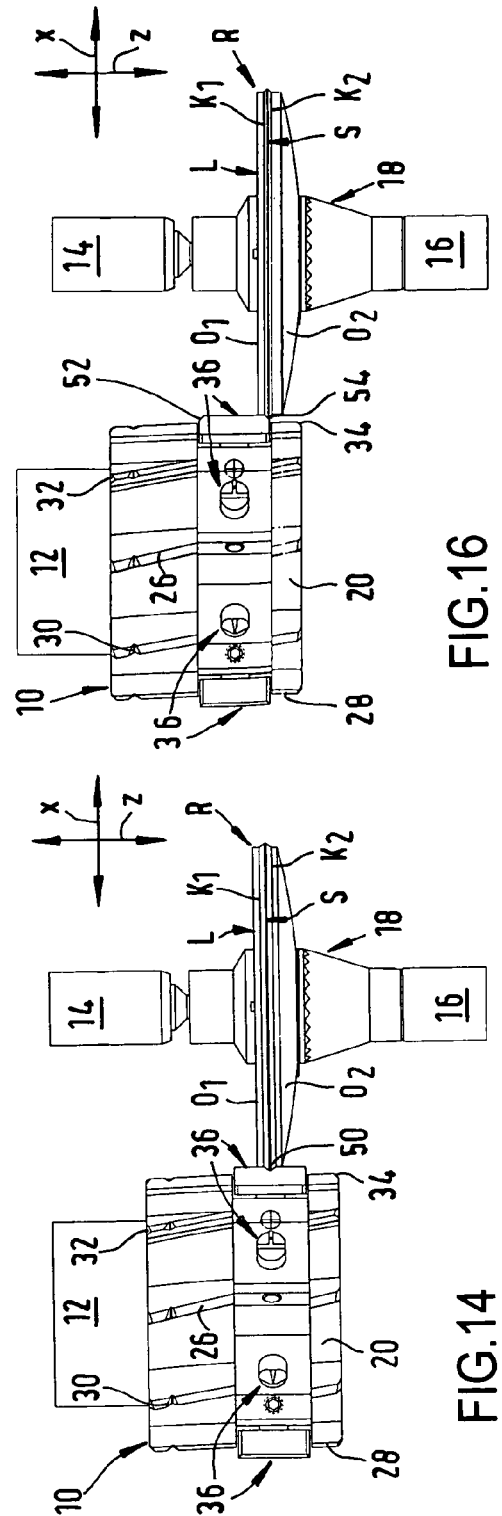

METHOD AND DEVICE FOR EDGE-MACHINING OF A PLASTIC OPTICAL LENS AND A COMBINATION TOOL THEREFOR

FIELD OF THE INVENTION

The invention relates to a method and a device for the edge-machining of a plastic optical lens with a controlled angle of rotation about a rotated axis and to a combination tool therefor for edge machining of an optical lens. In particular, the invention relates to the industrial, ie optimised with regard to accuracy and machining speed, machining of the edges of spectacle lenses made of plastics, such as polycarbonate, CR39 and so-called "HI-index" materials.

In the following, references to spectacle lenses should be understood to mean optical lenses or lens blanks for spectacles in particular made of the aforementioned usual plastic materials and with blank circumferential edges of any shape, whereby such lenses or lens blanks may be, but do not have to be, machined on one or both optically effective surface(s) prior to the machining of the edge thereof.

The purpose of the edge-machining of spectacle lenses is to finish-machine the edge of a spectacle lens so that the spectacle lens is ready for insertion into a spectacle frame or a spectacle holder. To this end, in prior art usually use is made of a method (see, for example, the applicant's patent application DE 101 19 662 A1) which may be roughly divided into two steps or procedural stages, namely a preliminary machining step and a finish-machining step and a suitable edge-machining device (see, for example, the applicant's patent application DE 101 14 239 A1), also known as an "edger".

During the preliminary machining of the edge of the lens, by means of a first edge-machining tool that is adjustable at least radially relative to the rotational axis of the workpiece and rotational about a rotational axis of the tool, the lens is provided, seen in plan view, with a circumferential contour which corresponds to the circumferential contour of the holder for the lens apart from a slight degree of oversizing if necessary. During the finish-machining of the edge of the lens, which is performed with another edge-machining tool, the edge of the lens is provided when viewed in cross section with a prespecified edge geometry primarily corresponding to its intended means of fastening to the holder. According to the requirements in question, during the finish-machining, the edge of the lens is also provided with a protective chamfer at the transition to one or both optically effective surfaces and optionally polished.

FIGS. 29 to 32 show the usual edge geometries used nowadays on finish-machined spectacle lenses. In FIGS. 29 to 32, the lens L, which during the edge machining is rotated with a controlled angle of rotation $\phi_B$ about the rotational axis of the workpiece B, is only shown in a partial sectional view in the area of its edge R adjoining the optically effective surfaces $O_1$, $O_2$. Seen in plan view from above in FIGS. 29 to 32, the edge R forms the circumferential contour U of the lens L which may deviate from the circular. Only in the special case of a circular shape, does the lens L have a constant distance or radius $r_B$ to the rotational axis of the workpiece B at every point of its circumferential contour U. If the circumferential contour U deviates from the circular, the radius $r_B(\phi_B)$ changes in relation to the angle of rotation $\phi_B$ with which the lens L is rotated about the rotational axis of the workpiece B.

Figure 29:
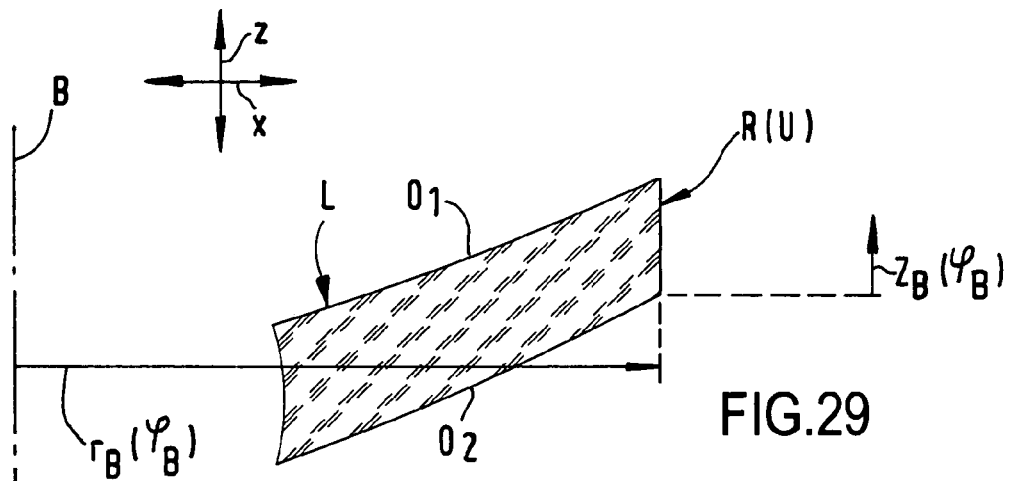

In the case of the lens L shown in FIG. 29, seen in a sectional view, the edge R is formed by a straight line running parallel to the rotational axis of the workpiece B. The lens L may have this basic edge geometry after the preliminary machining of the edge R and also after the finish-machining of the edge R. In the latter case, the lens L is frequently secured to the spectacle frame by means of fastening screws (not shown) that pass through holes (not shown) that are inserted in the lens L starting from one of the optically effective surfaces $O_1$, $O_2$.

Figure 30:
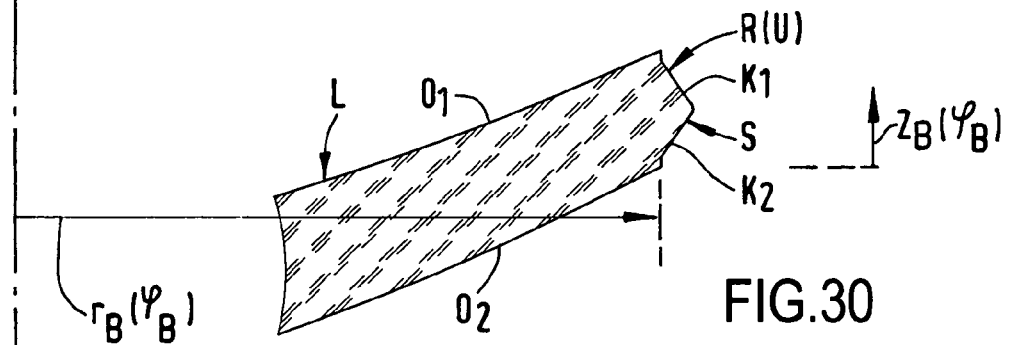

In the case of the lens L shown in FIG. 30, provided on the circumference of the otherwise straight edge R running parallel to the rotational axis of the workpiece B is a so-called bevel edge S that in sectional view has a triangular shape or, expressed another way, two flanks $K_1$ and $K_2$ which enclose a prespecified flank angle. A basic edge geometry of this kind, which the lens L may have optionally as early as after the preliminary machining but at any rate after the finish-machining of the edge R, permits the positive securing of the lens L to the spectacle frame. Here, the spectacle frame's holders have a groove on the internal circumference to accept the bevel edge S. Depending upon the holder geometry, the bevel edge S may have different flank angles.

Figure 31:
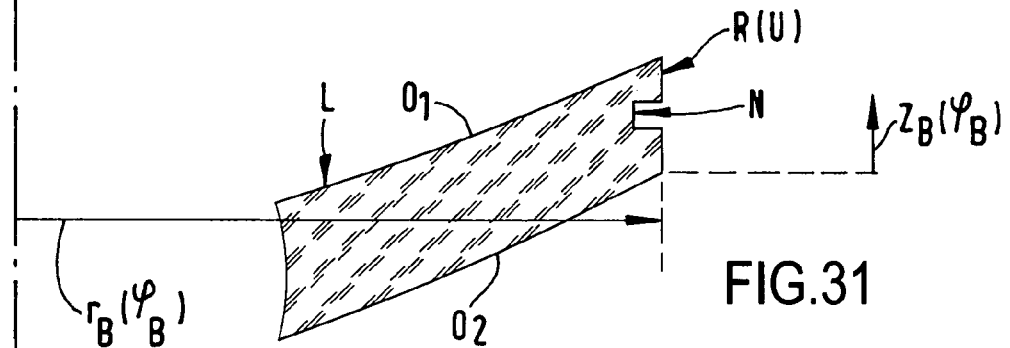

FIG. 31 shows a lens L which is provided on the circumference of the otherwise straight edge R running parallel to the rotational axis of the workpiece B with a slot or groove N of a prespecified width and depth. With this basic edge geometry, which the lens L may have after the finish-machining of the edge R, the groove N is used to accommodate a bevel provided on the internal circumference of the spectacle frame holder or a filament by means of which the lens L is secured to the spectacle frame. In deviation from the rectangular groove section shown, the groove N may also have a rounded groove base. In addition, depending upon the holder geometry or the diameter of the filament, the groove N may have different groove widths or depths.

Figure 32:
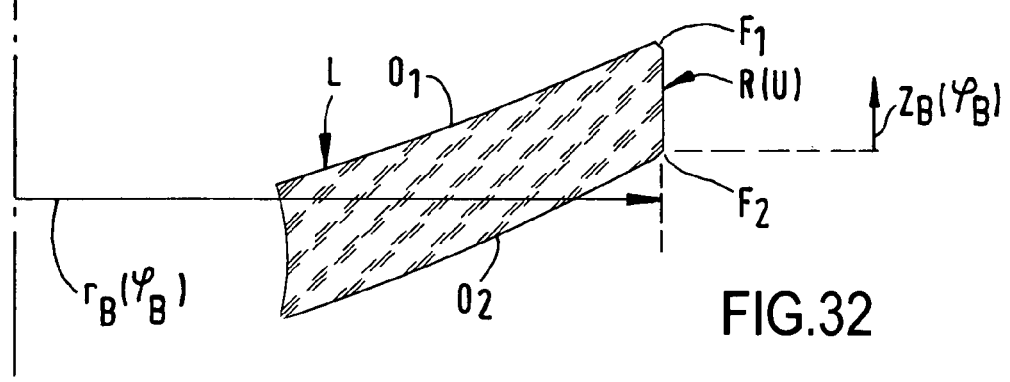

The lens L shown in FIG. 32 is provided on its otherwise straight edge running parallel to the rotational axis of the workpiece B with protective chamfers $F_1$, $F_2$ at the transition to the two optically effective surfaces $O_1$, $O_2$. According to the requirements in question, it is also possible for only one protective chamfer to be provided. The protective chamfers $F_1$, $F_2$ are chamfers with an angle of as a rule 45° (concave side) or 60° (convex side) and, as the name implies, are intended to prevent the optician being injured by sharp edges of the lens L when placing the lens L into the spectacle frame or spectacle holder. Protective chamfers $F_1$, $F_2$ of this type, which are formed during the finish-machining of the edge R of the lens L ("chamfering edges"), may also be provided in the basic edge geometries with a bevel edge S or a groove N.

In addition to the formation of these basic edge geometries, if required, namely if the edge R of the lens L held on the spectacle frame is still visible, it may be necessary to polish the edge R at least partially as an additional step of the finish-machining, so that at visible points its surface is not matt, but glossy.

Finally, it should always be mentioned in this context that, in particular in the case of lenses L with a circumferential contour U that deviates from the circular or is supposed to deviate from this after the edge-machining of the optionally thickness-optimised lens L, during the edge-machining of the lens L, the height values $Z_B(\Phi_B)$ for the edge R and also the thickness of the edge R may change at the point of engagement with the edge-machining tool in dependence on the angle of rotation $\Phi_B$ with which the lens L is rotated about the rotational axis of the workpiece B. Against this background, in order to prevent during the edge-machining of the lens L, the bevel edge S or the groove N being formed with changing distances to the optically effective surfaces $O_1$, $O_2$ in circumferential view on or in the edge R, which would result in an unsightly projection of the mounted lens L from the spectacle frame, and to prevent the size of the partially visible protective chamfers $F_1$, $F_2$ in circumferential view changing in an unsightly manner, it is usual during the edge-machining to adjust the edge-machining tool not only radially to the rotational axis of the workpiece B (X-axis) but also, in dependence on the angle of rotation $\Phi_B$ of the lens L, to adjust it parallel to the rotational axis of the workpiece B (z-axis) so that the edge geometry is created at a prespecified height.

It is clear from the above, that there is a plurality of possible edge geometries which should be created as efficiently as possible on the edge of the lens. In addition to additional edge-machining tools, which were fitted by means of fairly complicated technology to additional spindles in known edge-machining devices (see, for example, DE 43 08 800 A1, EP 0 820 837 B1, DE 198 34 748 A1), also proposed in this context are rotationally drivable combination tools (see, for example, DE 87 11 265 U1, EP 0 705 660 B1) which may be used to perform both preliminary machining and finish-machining steps.

For example, EP 0 705 660 B1, discloses a generic combination tool for the edge-machining of spectacle lenses with an overhung-mounted base body to the circumference of which are secured two diametrically opposite milling cutters extending in an axial direction, ie parallel to the rotational axis of the tool C. The milling cutters may be used to preliminary machine the edge of the lens to be machined in such a way that the lens is provided in plan view with a circumferential contour which corresponds to a circumferential contour of a holder for the lens apart from a slight degree of oversizing if necessary. It is also possible to use the V-shaped recesses provided on the milling cutters to create a bevel edge at the edge of the lens in a preliminary machining step. In addition, in this combination tool, a fine-grinding tool is flanged to the axial face of the base body to finish-machine the edge of the lens with said tool having a circumferential groove with a V-shaped cross section in its cylindrical contact surface for finish-machining the bevel edge. Finally, attached to the end of the fine-grinding tool facing away from the base body is a conical grinding section with which a protective chamfer may be created at the edge of the lens at the transition to only one of the two optically effective surfaces.

EP 0 705 660 B1 also discloses a device for the edge-machining of spectacle lenses with two aligned holding shafts rotatable with a controlled angle of rotation about the rotational axis of a workpiece between which the lens may be clamped. In addition, this device has a tool spindle with which the combination tool may be rotationally driven about a rotational axis of a tool whereby the rotational axis of the tool substantially runs parallel to the rotational axis of the workpiece. In this example of prior art, the holding shafts and the tool spindle may be moved with position control towards each other in a first axial direction X and parallel to each other in a second axial direction Z perpendicular to the first axial direction for which the tool spindle is arranged on a Z-slide while the holding shafts are arranged on an X-slide.

As a comparison with the possible edge geometries described in more detail above reveals, the combination tool according to EP 0 705 660 B1 is only able to create a small part of the possible edge geometries. In addition, this combination tool is relatively long which, in particular with the overhung mounting of the combination tool, results in a certain tendency to vibrate that may be detrimental to the machining quality. In addition, particularly during the finish-machining of the bevel edge, when viewed in the circumferential direction, the fine grinding tool in the combination tool is always in machining engagement with the edge of the lens over a relatively wide area. If the Z-slide then effects an axial movement of the combination tool parallel to the lens holding shafts in order, as described above, to machine the bevel edge at different positions in the Z-direction on the edge of the lens, depending upon the size of the fluctuations of the edge in the Z-direction this results in a greater or lesser "smearing" or "blurring" of the bevel edge so that it is not provided with an exactly specified geometry.

Following on from the prior art in EP 0 705 660 B1, the invention is based on the problem of disclosing an efficient method and a creating a simply constructed device to provide the greatest possible flexibility with regard to possible edge geometries that is suitable for industrial application and by means of which the drawbacks of the prior art may be avoided. The object of the invention also includes the provision of a suitably designed combination tool that is as compact as possible.

According to one of the basic concepts of the invention, in a method for the edge-machining of an optical lens L, namely a plastic spectacle lens that may be rotated with a controlled angle of rotation $\phi_B$ about a rotational axis of a workpiece B, in which the edge R of the lens L is first preliminary machined by means of a combination tool which is at least radially adjustable relative to the rotational axis of the workpiece B and rotatable about a rotational axis of a tool C, whereby the lens is provided in plan view with a circumferential contour U which corresponds to a circumferential contour of a holder for the lens L apart from a slight degree of oversizing if necessary, and in which the edge R of the lens L is then finish-machined by means of the combination tool, whereby when viewed in cross section the edge R of the lens L is provided with a pre-specified edge geometry in accordance with the intended method for securing it to the holder, optionally provided with a protective chamfer $F_1$, $F_2$ at the transition to one or both optically effective surfaces $O_1$, $O_2$ and optionally polished, the preliminary machining of the edge R and the finish-machining of the edge R takes place by means of a combination tool which comprises both milling cutters and at least one lathe tool with said combination tool being rotated at a controlled rotational speed $n_c$ about the rotational axis of the tool C during a milling machining of the edge R, and being swivelled with a controlled angle of rotation $\phi_c$ about the rotational axis of the tool C before and optionally also during a lathe machining of the edge R.

In addition, the invention discloses in particular for the performance of the aforementioned method a combination tool for the edge-machining of an optical lens L, namely a plastic spectacle lens, with a base body on which is provided a plurality of milling cutters that, when the combination tool is rotated about a rotational axis of a tool C, define a cutting circle and by means of which the edge R of the lens L can in particular be subject to preliminary machining in such a way that, seen in plan view, the lens L is provided with a circumferential contour U which corresponds to a circumferential contour of a holder for the lens L apart from a slight degree of oversizing if necessary whereby the combination tool is characterised by the fact that the base body is also provided with at least one lathe tool commonly referred to as a lathe tool that is arranged axially displaced with regard to the milling cutters in the direction of the rotational axis of the tool C, or is arranged at the axial height of the milling cutters in the circumferential direction of the combination tool between the milling cutters with a lathe cutter that is radially internally displaced in relation to the cutting circle of the milling cutters, whereby the lathe tool has a cutter geometry by means of which the edge R of the lens L may be in particular finish-machined so that the edge R of the lens L has a prespecified edge geometry according to the intended method of securing it to the holder when viewed in cross section and/or is provided with a protective chamfer $F_1$, $F_2$ at the transition to one or both optically effective surfaces $O_1$, $O_2$ and/or is polished.

Finally, according to the invention, in the case of a device that is in particular suitable for the performance of the above method using in particular the aforementioned combination tool for the edge-machining of an optical lens L, namely a plastic spectacle lens, with two aligned holding shafts rotatable with a controlled angle of rotation $\phi_B$ about a rotational axis of a workpiece B between which the lens L may be clamped, and that has a tool spindle, by means of which the combination tool may be driven rotationally about a rotational axis of a tool C running substantially parallel to the rotational axis of the workpiece B, whereby the holding shafts and the tool spindle may be moved with position control towards each other in a first axial direction X and optionally parallel to each other in a second axial direction Z perpendicular to the first axial direction X, for the lathe machining of the edge R of the lens L, the combination tool may be swivelled with a controlled angle of rotation $\phi_C$ about the rotational axis of the tool C by means of the tool spindle so that a lathe tool provided on the combination tool may be brought into a defined lathe machining engagement with the edge R to be machined.

In essence, therefore, as far as the method is concerned, the invention is based on employing or using for the edge-machining of a plastic optical lens, in particular a spectacle lens, a combination tool by means of which both a milling machining operation and a lathe machining operation on the edge R of the lens L is possible. In this way, by a milling machining operation, in which the combination tool is rotated at a controlled rotational speed $n_c$ about the rotational axis of the tool C, relatively high quantities of material from the lens L can be machined in a very short time in order, for example, to provide the lens L in a preliminary machining step, seen in plan view, with a circumferential contour U that corresponds to the circumferential contour of the holder for the lens apart from a slight degree of oversizing if necessary. The similarly facilitated lathe operation, before or during which the combination tool is swivelled with a controlled angle of rotation $\phi_C$ about the rotational axis of the tool C, can then be used for the finish-machining of the edge R of the lens L in order, in dependence on the cutter geometry of the lathe tool, to provide the edge R of the lens L, when viewed in cross section, with a prespecified edge geometry in accordance with the intended means of securing it to the holder and/or to create a protective chamfer at the edge R of the lens L at the transition to one or both optically effective surfaces $O_1$, $O_2$ and/or to polish the edge R of the lens L. A substantial advantage of the lathe machining of the edge R enabled by the invention, in which the lathe tool is in a defined rotational angle setting or only tracked or swivelled with a controlled angle of rotation $\phi_c$, over the (fine) grinding known from prior art, in which the grinding tool is rotated about the rotational axis of the tool, is seen in the fact that, depending upon the cutter geometry of the lathe tool, during the lathe machining of the edge R, when viewed in the circumferential direction said lathe tool may be in a substantially punctiform machining engagement with the edge R of the lens L. If, in the case of punctiform machining engagement of this type with a lathe tool with a corresponding cutter geometry, a bevel edge S is placed on the edge R of the lens L, for example, thereby performing a relative axial movement of the combination tool relative to the lens L parallel to the rotational axis of the workpiece B in order, as described above, to machine the bevel edge S at different heights on the edge R of the lens L, there is no longer any risk of the "smearing" of the bevel edge S which is thereby provided with a geometry precisely prespecified by the cutter geometry of the lathe tool.

As far as the tool is concerned, proposed in essence is a combination tool that is so-to-speak a combination of a milling cutter and a lathe tool revolver. Compared to a grinding tool, a lathe tool enables the implementation of significantly more and different cutter geometries so that edge geometries can be achieved on the lens L, for example the slot or groove N described at the beginning, with a lathe tool having a corresponding lathe cutter, while the grinding tool in the combination tool according to prior art is unable to achieve edge geometries of this kind; prior art rather requires complicated machining with additional tools and the associated peripherals (spindle, drive, adjustment mechanisms, etc).

In one embodiment according to the invention, the at least one lathe tool is arranged axially displaced relative to the milling cutters so that the lathe tool may also protrude over the cutting circle of the milling cutters without colliding with the edge R during the milling of the edge R of the lens L. This is a simple way to create additional design scope with regard to the design of the lathe tool or the lathe tool's cutter geometry and should again be evaluated as advantageous with regard to the flexibility of the tool concept as far as the plurality of possible edge geometries is concerned. Compared to the known combination tools, the proposed combination tool can nevertheless have a very short axial length since, even if its lathe the cutter is wider than the maximum edge thickness of the lens L to be machined therewith or the lens L which has been machined therewith, the lathe tool can still be kept much narrower than the grinding tools in the known combination tools. This very compact design of the combination tool in the axial direction is conducive to good machining quality, to be more precise to high surface finishes, insofar that the combination tool has an only slight tendency to vibrate if any. Here, it should also be noted that a short combination tool may also be arranged close to the tool spindle mounting together with the possibility of using short holding shafts for the lens L, which contributes overall to a very rigid edger construction and accordingly lenses L may be machined more quickly with a better machining quality.

In an alternative embodiment according to the invention, the lathe tool, with a lathe cutter which is radially internally displaced relative to the cutting circle of the milling cutters, is arranged at the axial height of the milling cutters in the circumferential direction of the combination tool between the milling cutters so that during the continuous rotation of the combination tool during a milling operation the lathe cutter is unable to be brought into machining engagement with the edge R of the lens L. One advantage of this embodiment may be seen in the fact that the combination tool may be built even shorter for the achievement of excellent machining quality without impairing the machining options.

It should also be noted with regard to the combination tool according to the invention that for a lathe machining operation following a milling machining operation, the combination tool may first be stopped and then be angle-positioned with its lathe tool relative to the edge R of the lens L to be machined. The lathe tool may therefore be designed completely independently of the milling cutters with regard to the cutter geometry (in particular the geometry of the milling cutter and the rake angle and clearance angle) and the cutting material and accordingly optimally adapted to the material of the lens L.

Finally, as far as the device is concerned, the device known for example from DE 101 14 239 A1 of the applicant, which is position-controlled in the two linear axes X and Z and angle-controlled in the rotational axis of the workpiece B, is simply supplemented by another (CNC-) controlled axis, namely the angle-controlled rotational axis of the tool C. This permits the swivel-positioning of the combination tool with regard to the edge R of the lens L to be machined so that the combination tool's lathe tool may always be brought into a defined lathe machining engagement with the edge R of the lens L to be machined.

In sum, the edge R of the lens L to be machined may be subjected to both a milling machining operation with a relatively high machining volume and a (fine) lathe machining operation with only one combination tool which, in addition to milling cutters has at least one lathe tool, in only one device and with only one clamping of the lens L so that a plurality of edge geometries [extensive design possibilities for the lathe tool's cutting edge geometry] of high quality, ie improved geometric accuracy when viewed macrogeometrically [viewed in a circumferential direction, substantially punctiform machining engagement is possible] and high surface quality when viewed microgeometrically [a vibration-avoiding or reducing short design of the combination tool is possible; extensive design scope for the cutter geometry of the lathe tool with regard in particular to the rake and clearance angles] may be machined rapidly and reliably.

Figure 1:
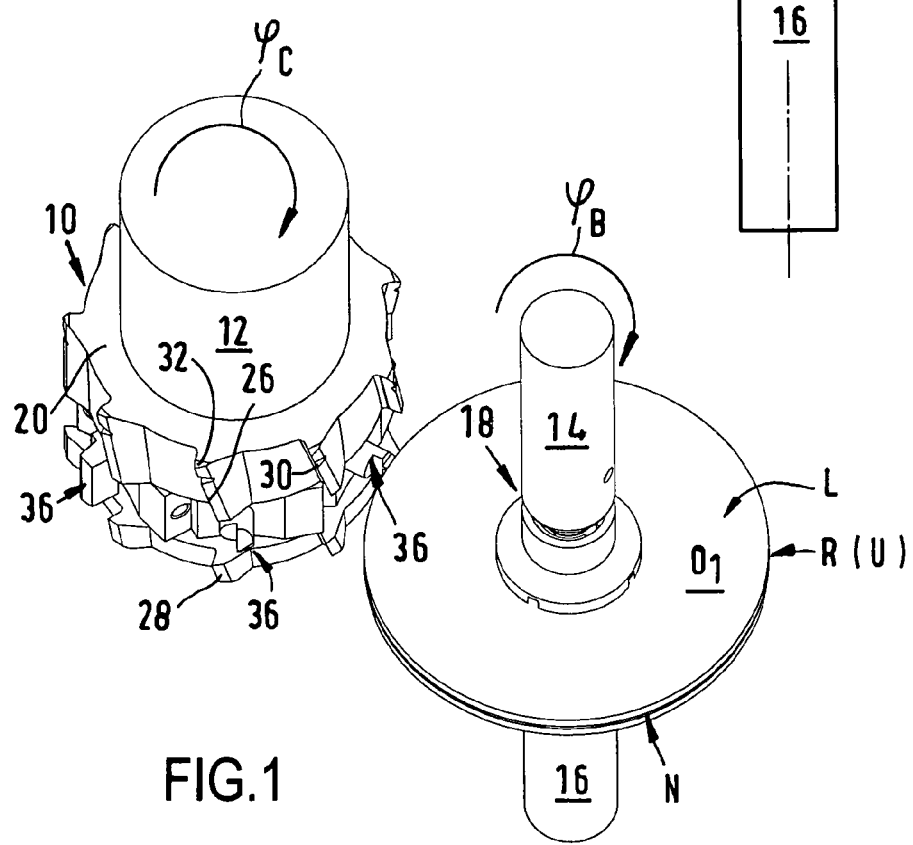
Figure 3:
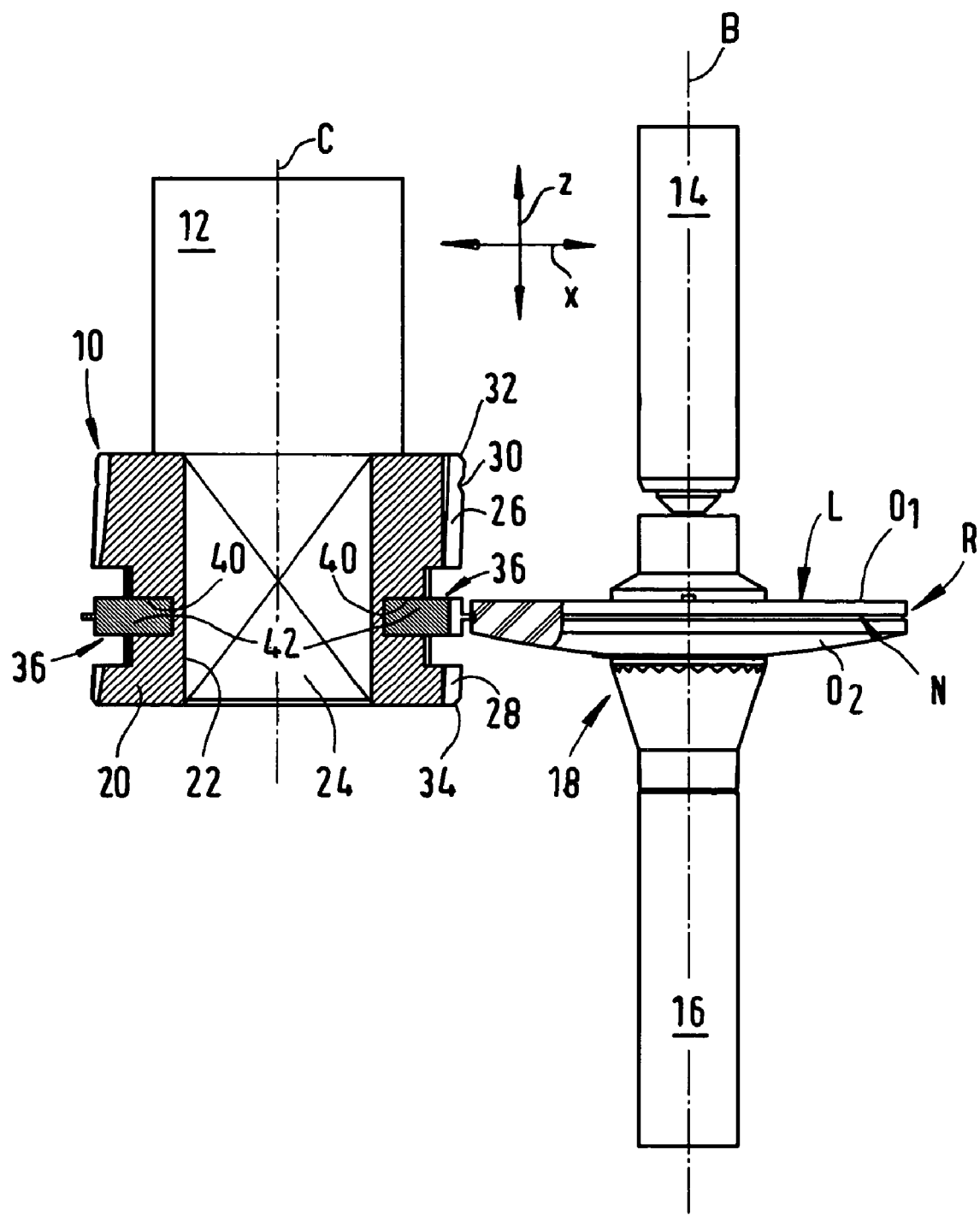
Figure 4:
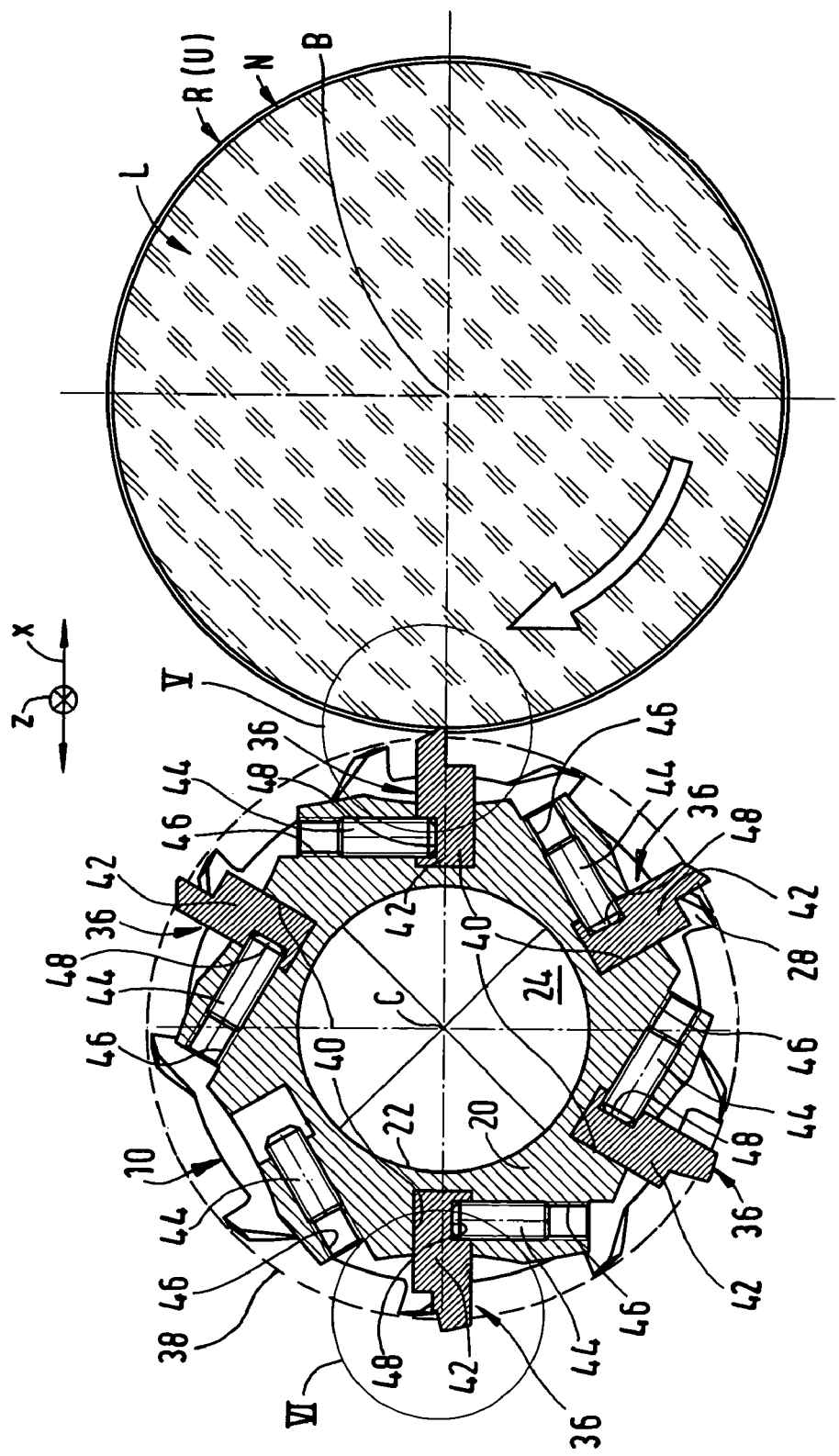
Figure 5:
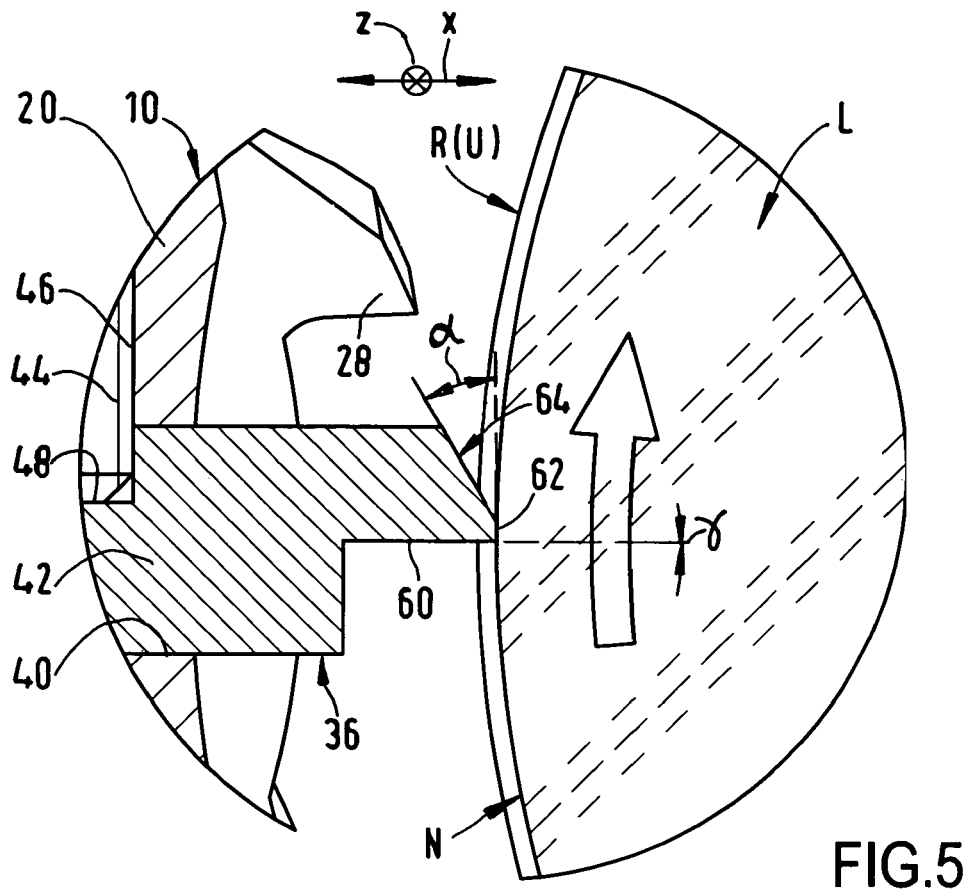
Figure 6:
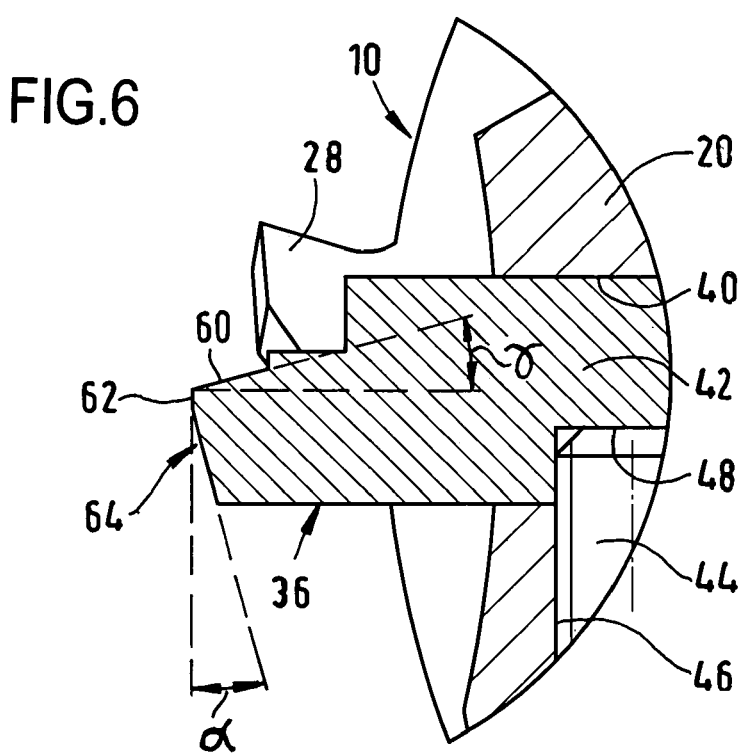
Figure 20:
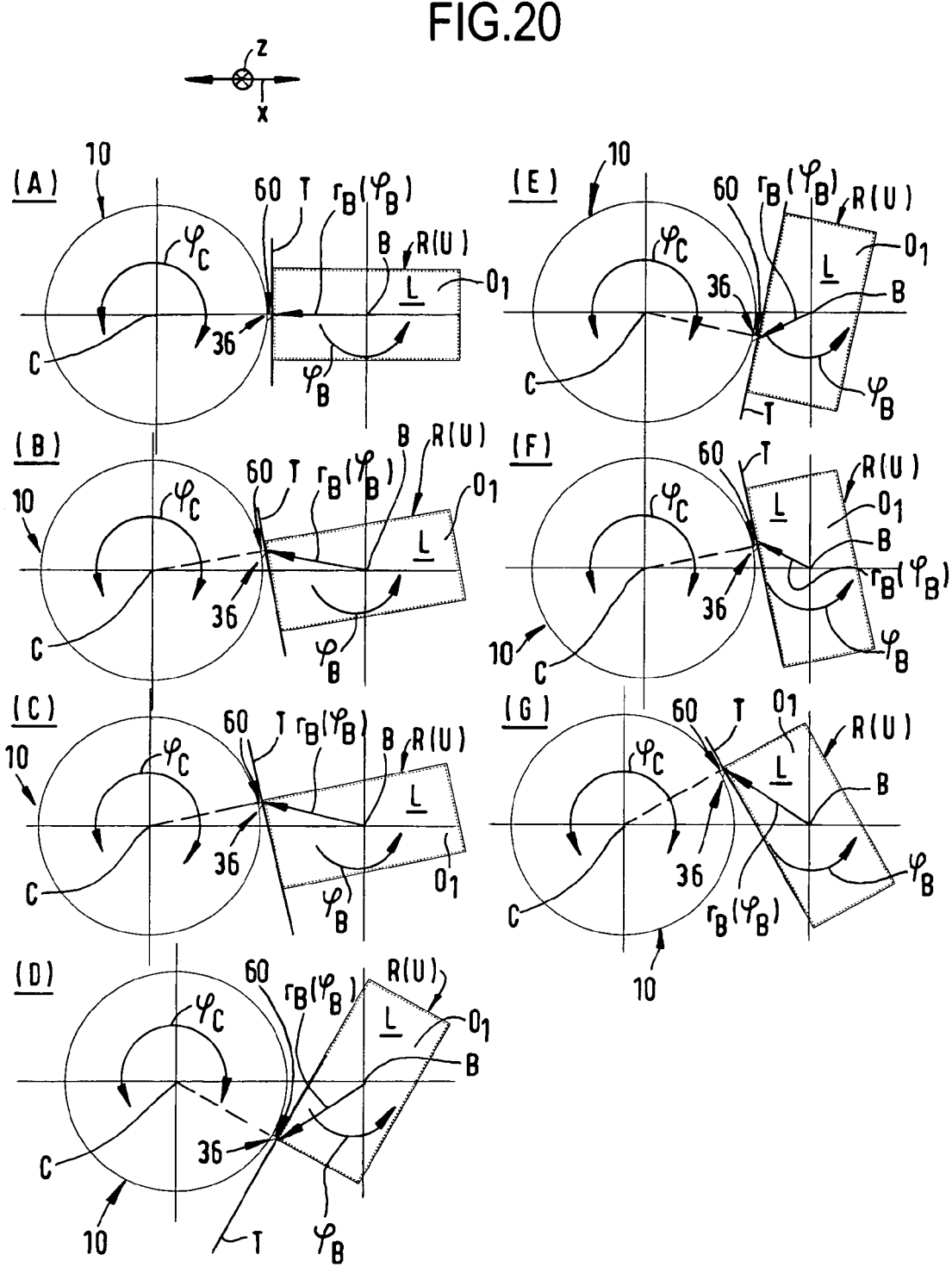
Figure 22:
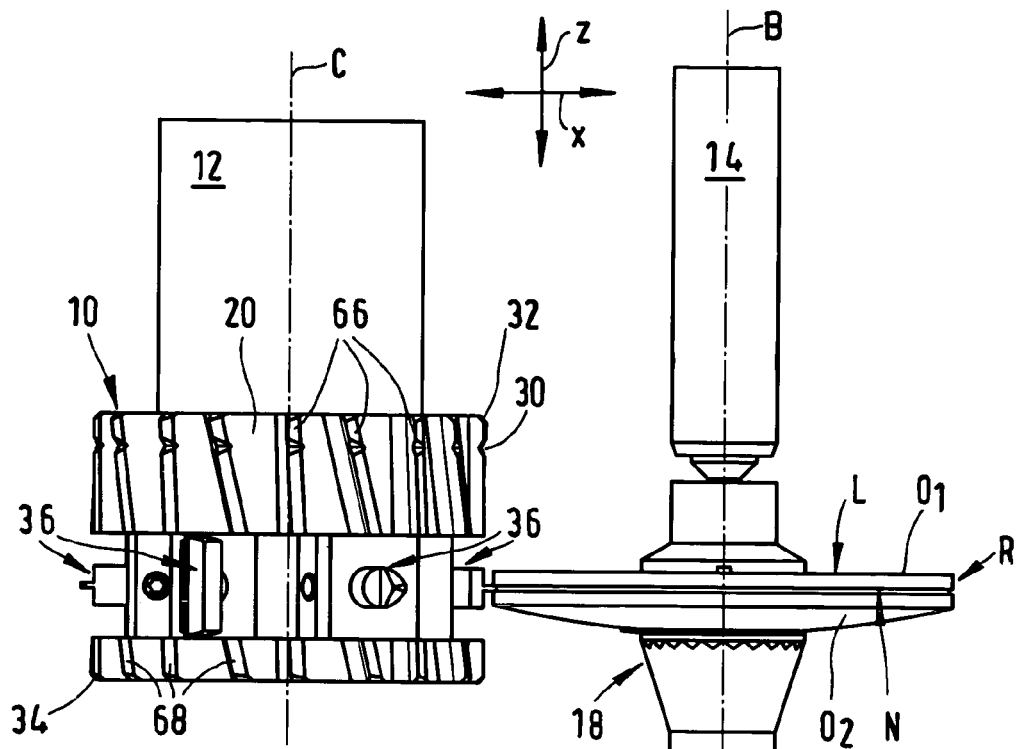
Figure 21:
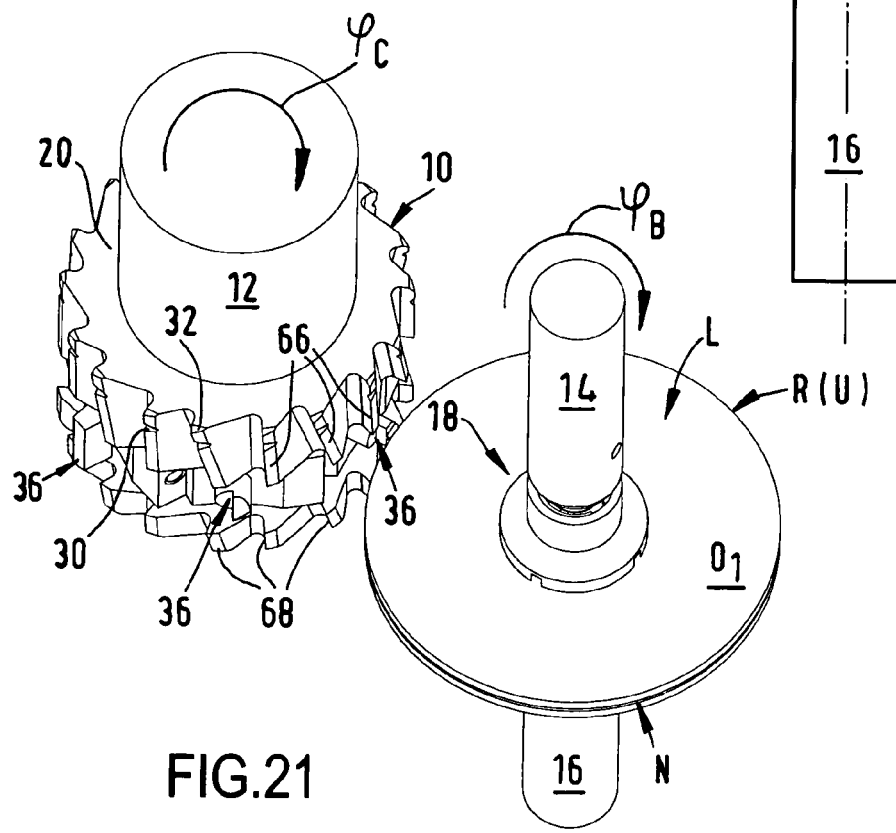
Figure 24:
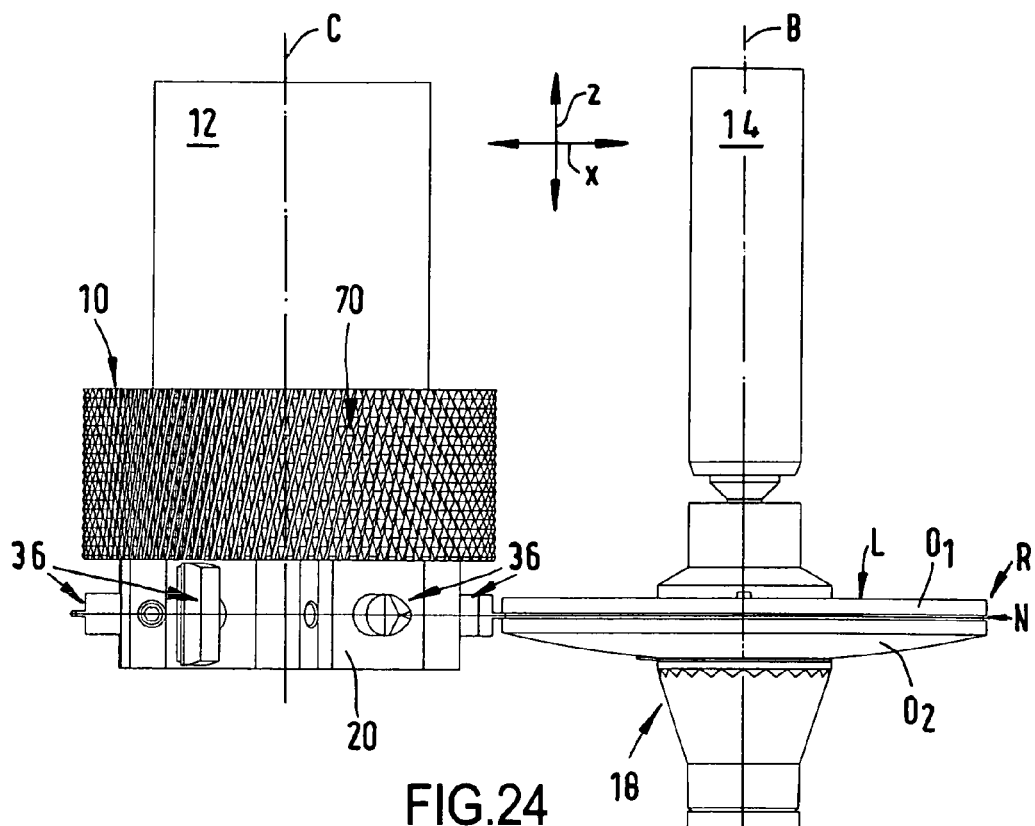
Figure 23:
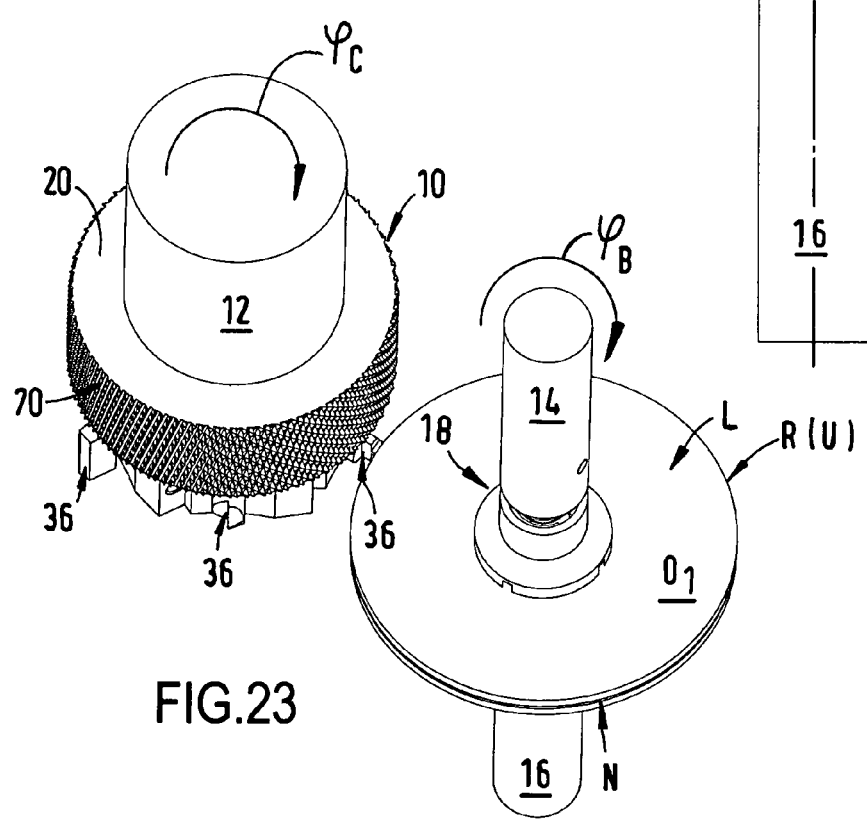
Figure 26:
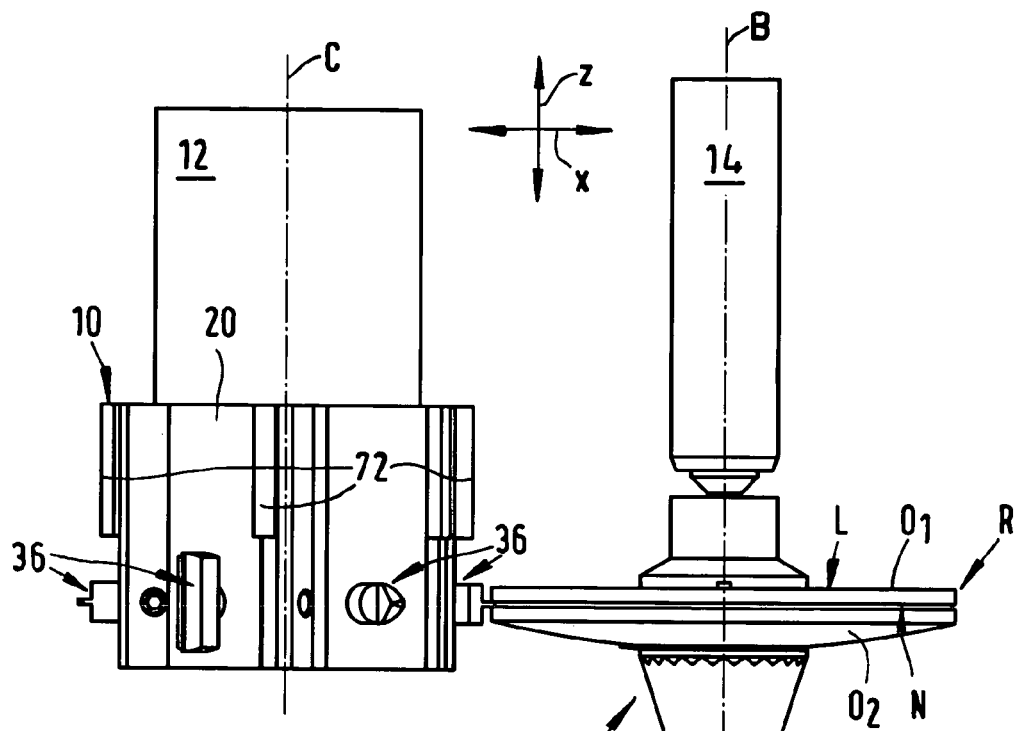
Figure 25:
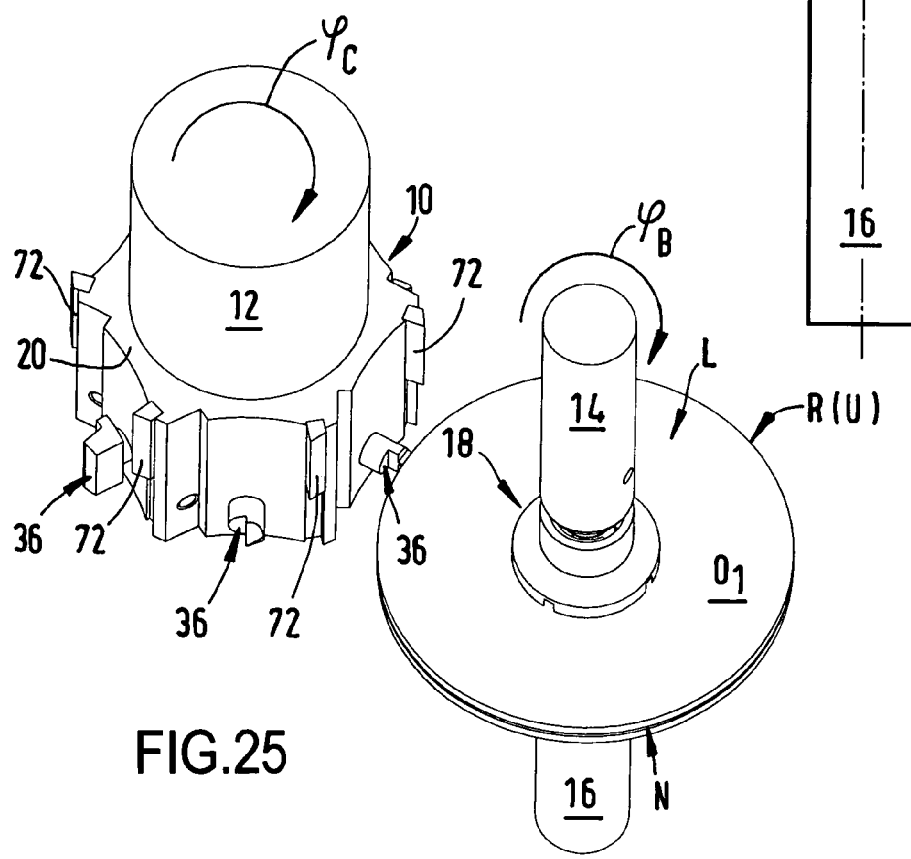
Figure 27:
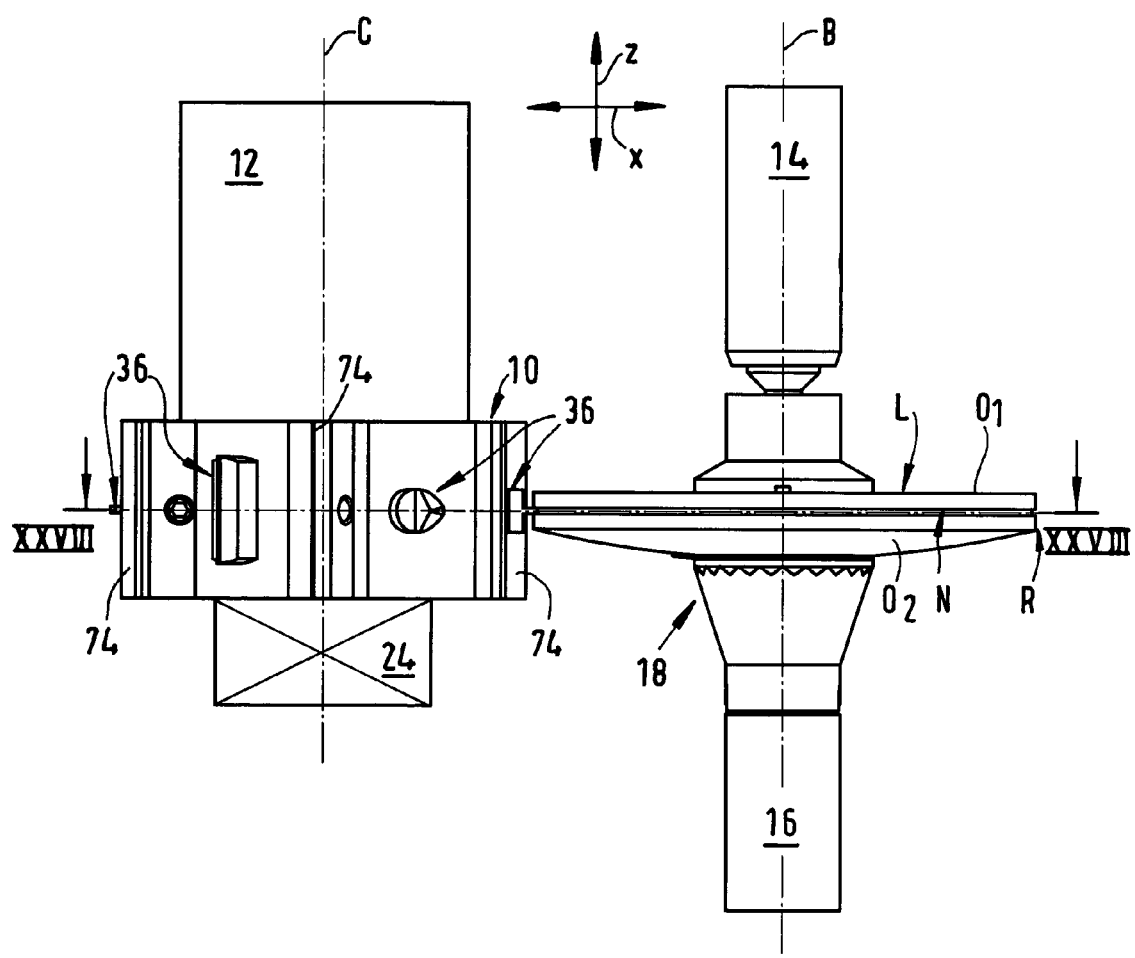
Figure 28:
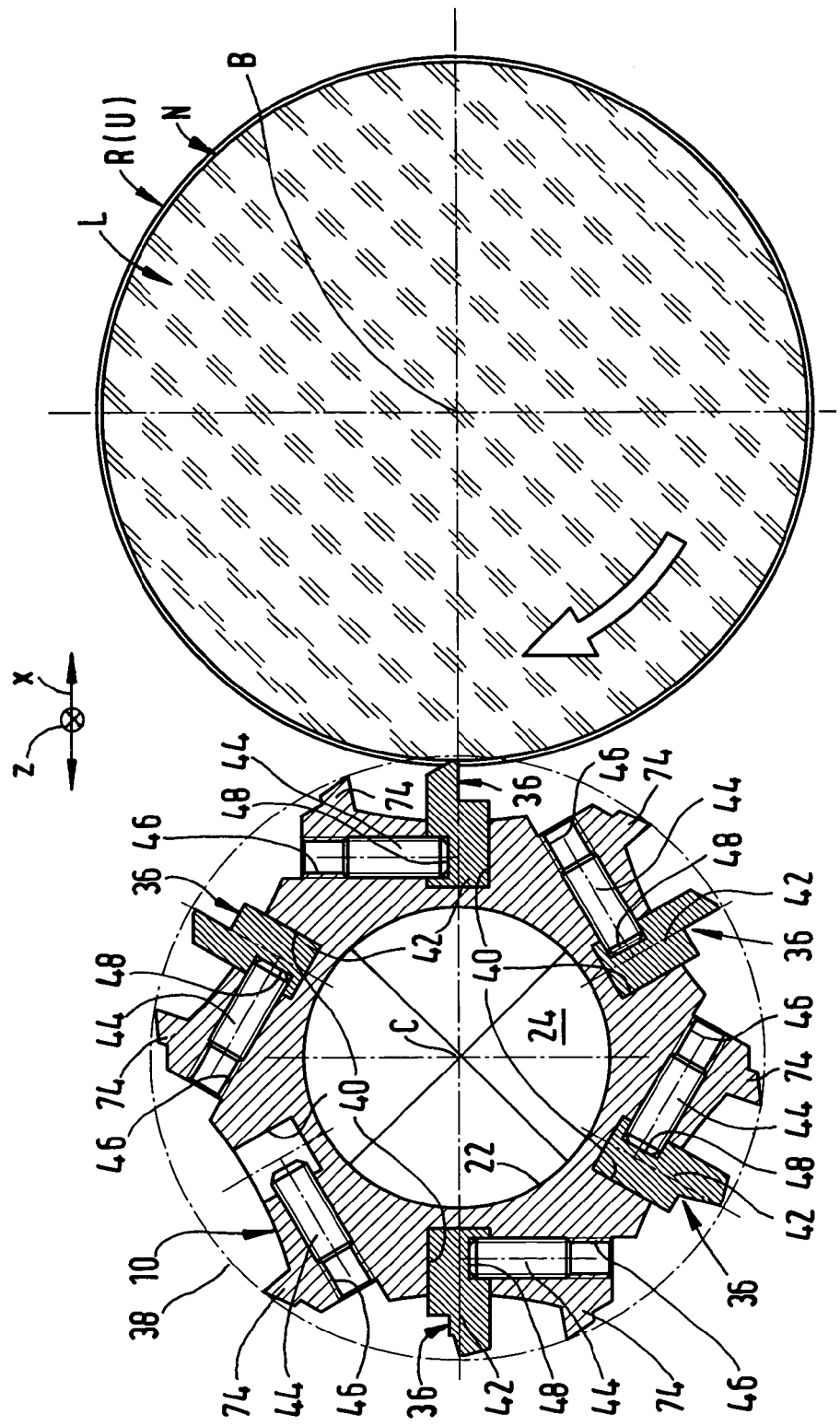

The invention will be further described with reference to preferred embodiments shown in the attached, to some extent schematic, drawings. These show:

FIG. 1 A perspective view of a combination tool according to the invention in accordance with a first embodiment, which is in lathe machining engagement with the edge R of a lens L to be machined, FIG. 2 a side view of the combination tool according to FIG. 1 which is in lathe machining engagement with the edge R of the lens L to be machined, FIG. 3 a side view corresponding to FIG. 2 of the first embodiment in which the combination tool is cut and the lens L is shown partially broken off, FIG. 4 a cross-sectional view corresponding to the line indicated at IV-IV in FIG. 2 in a larger scale than that used in FIG. 2, FIG. 5 an enlarged representation of detail V in FIG. 4, FIG. 6 an enlarged representation of detail VI in FIG. 4, FIGS. 7-19 side views, which correspond in the manner of representation to FIG. 2, of the first embodiment showing the edge-machining processes that may be performed with the combination tool according to the first embodiment, FIG. 20(A)-(G) schematic diagrams of a combination tool according to the invention in a plan view illustrating how a lathe tool in the combination tool is moved or tracked by superposed control in the X-axis [x ($\phi_B$, $r_B$ ($\phi_B$)] and the C-axis [($\phi_C$, ($\phi_B$, $r_B$ ($\phi_B$))] in dependence on the angle of rotation $\phi_B$ of the lens L and its radius $r_B$ ($\phi_B$) during the edge-machining, FIG. 21 a perspective view of a combination tool according to the invention according to a second embodiment which is in lathe machining engagement with the edge R of a lens L to be machined and has a different design of the milling cutters as compared to the first embodiment, FIG. 22 a side view of the combination tool according to FIG. 21 which is in lathe machining engagement with the edge R of the lens L to be machined, FIG. 23 a perspective view of a combination tool according to the invention according to a third embodiment which is in lathe machining engagement with the edge R of a lens L to be machined and has a different design of the milling cutters as compared to the first and second embodiments, FIG. 24 a side view of the combination tool according to FIG. 23 which is in lathe machining engagement with the edge R of the lens L to be machined, FIG. 25 a perspective view of a combination tool according to the invention according to a fourth embodiment which is in lathe machining engagement with the edge R of a lens L to be machined and has a different design of the milling cutters as compared to the first to third embodiments, FIG. 26 a side view of the combination tool according to FIG. 25 which is in lathe machining engagement with the edge R of the lens L to be machined, FIG. 27 a side view of a combination tool according to the invention according to a fifth embodiment which is in lathe machining engagement with the edge R of a lens L to be machined and in which, unlike the first to fourth embodiments, the lathe tools are arranged at the axial height of the milling cutters in the circumferential direction of the combination tool between the milling cutters with lathe cutters which are radially internally displaced in relation to the cutting circle of the milling cutters, FIG. 28 a cross-sectional view corresponding to the line indicated at XXVIII-XXVIII in FIG. 27 in a larger scale than that used in FIG. 27, and FIGS. 29-32 broken off cross-sectional views of spectacle lenses L in the area of the edge R illustrating the currently usual basic edge geometries on spectacle lenses with finished edges.

Regarding the figures, here, it should be noted in advance that in order to simplify the representation, the spectacle lenses L shown have very simple geometries only, namely purely spherical optically effective surfaces $O_1$, $O_2$ and circular or rectangular circumferential contours U. Obviously, the invention is not restricted to these geometries. On the contrary, the lenses L may have any circumferential contour U and also have optically effective surfaces $O_1$, $O_2$ deviating from a spherical form, for example aspherical, toric, atoric or progressive surfaces or even surfaces with free-form geometry depending upon the desired optical effect.

To simplify the representation, the only parts of the device for the edge-machining of plastic spectacle lenses L shown schematically in FIGS. 1 to 6 are the tool spindle 12 bearing a combination tool 10, whereby said spindle may be driven rotationally about the rotational axis of the tool C, and the two aligned holding shafts 14, 16 that may be driven rotationally about the rotational axis of the workpiece B between which shafts the spectacle lens L may be clamped. Here, the rotational axis of the workpiece B and the rotational axis of the tool C are parallel to each other. The holding shafts 14,16 may be rotated with a controlled angle of rotation $\phi_B$ about the rotational axis of the workpiece B by means of a suitable drive and allocated control (not shown). In addition, the holding shafts 14, 16 and the tool spindle 12 may be moved with position control towards or away from each other in a first axial direction X and parallel to each other in a second axial direction Z perpendicular to the first axial direction X. Expediently, these axial movement options during the edge-machining are assigned to the tool spindle 12. Provided for this are suitable slides with allocated guides and drives and an allocated control in each case (not shown). In this regard, express reference is made to the applicant's DE 101 14 239 A1. Novel compared thereto is the fact that for the lathe machining of the edge R of the lens L to be machined, the combination tool 10 may be also swivelled with a controlled angle of rotation $\phi_C$ about the rotational axis of the tool C by means of the tool spindle 12 for which a suitable drive and allocated control (not shown) are also provided. Both the holding shafts 14, 16 and the tool spindle 12 may, therefore, be rotated at a controlled rotational speed $n_B$, $n_C$ and with a controlled angle of rotation $\phi_B$, $\phi_C$.

Between the holding shafts 14, 16, the spectacle lens L is fixed by means of an arrangement 18 that is known per se for blocking and clamping spectacle lenses L in such a way that it may rotate coaxially with the holding shafts 14, 16. This arrangement 18 is described in detail in the applicant's DE 101 14 238 A1 to which express reference is made here.

According to FIGS. 1 to 6, the combination tool 10 has a metallic base body 20 that is used on the one hand for the securing to the tool spindle 12 and on the other hand as a support for the cutting means. As FIGS. 3 and 4 show, the base body 20 has a cylinder surface 22 on its internal circumference by means of which the combination tool 10 may be secured to the tool spindle 12. In FIGS. 3 and 4 it is indicated schematically that it is possible to use a commercially available expansion arbor 24 flanged to the tool spindle 12 for this. This may be expanded hydraulically in the radial direction by means of a clamping bolt (not shown) in order to provide a positive torsion-resistant connection between the base body 20 and the tool spindle 12.

Figure 7:
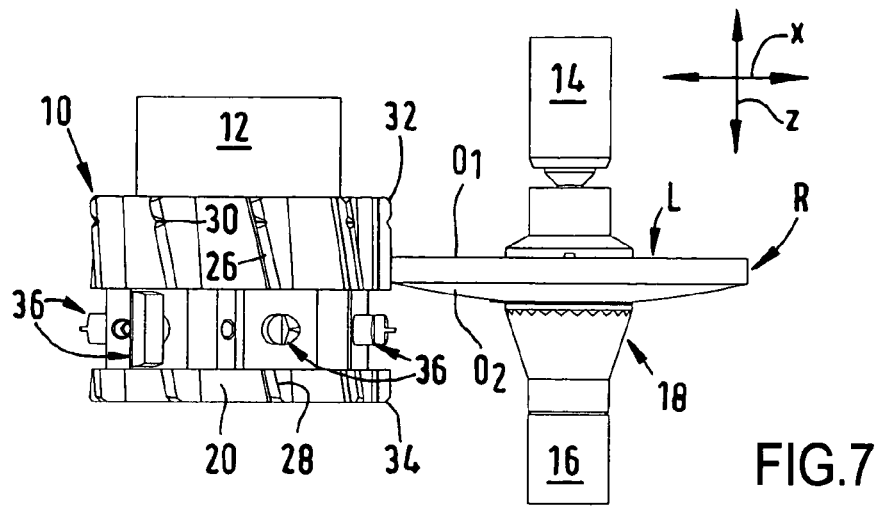

On the external circumference, the ring-shaped base body 20 is provided on each of two axially spaced-apart areas with a plurality of milling cutters 26, 28, nine in the embodiment shown, distributed equally over the circumference that are preferably soldered to the base body 20. Seen in a plan view from above, the milling cutters 26, 28 define a cutting circle during the rotation of the combination tool 10 about the rotational axis of the tool C and are primarily used for the preliminary machining of the edge R of the lens L so that seen in a plan view the lens L is given a circumferential contour U which corresponds to a circumferential contour of the holder for the lens L apart from a slight degree of oversizing if necessary. FIG. 7 shows this type of preliminary machining of the edge R of the spectacle lens L by means of the milling cutters 26, whereby the edge R is given a geometry corresponding to that in FIG. 29. Here, the combination tool 10 rotates at a controlled rotational speed $n_C$ about the rotational axis of the tool C while the spectacle lens L is rotated with a controlled angle of rotation $\Phi_C$ about the rotational axis of the workpiece B. At the same time, the combination tool 10 is moved with position control in the X-axis towards or away from the rotational axis of the workpiece B in accordance with the circumferential contour U to be created on the spectacle lens L depending upon the angle of rotation $\Phi_B$ of the spectacle lens L.

As FIG. 2 also illustrates, in this embodiment, seen in plan view with a viewing direction perpendicular to the rotational axis of the tool C, each milling cutter runs inclined relative to the rotational axis of the tool C whereby the milling cutters 26, 28 do not differ from each other as far as their inclination is concerned. Compared to milling cutters running parallel to the rotational axis of the tool C, this inclination or pitch of the milling cutters 26, 28 advantageously results in lower process forces and reduced swarf which has a positive effect on the results of the machining, ie the surface quality of the machined edge R.

Figure 8:
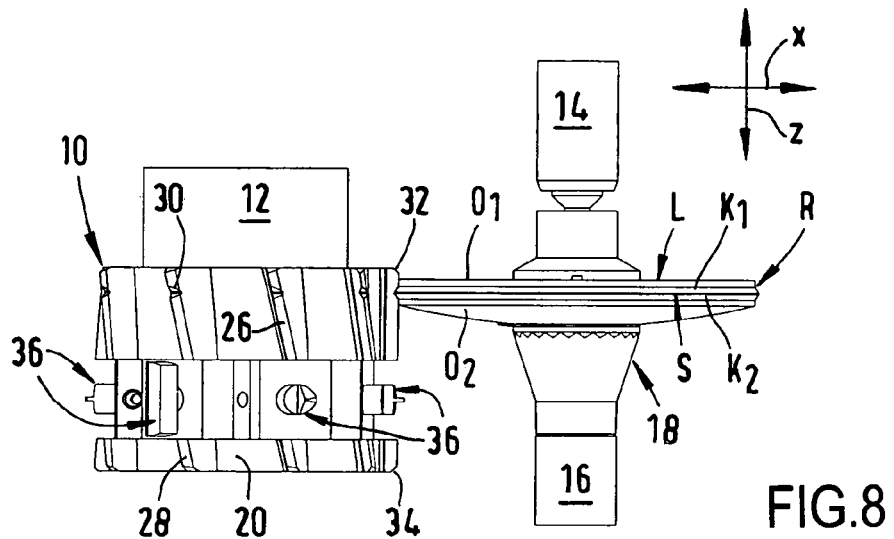

Also identifiable from FIGS. 1 and 2 is the fact that the upper milling cutters 26 are each provided with a V-shaped recess 30 which is used to form a bevel edge S on the edge R of the lens L, as shown in FIG. 30, whereby the V-shaped recesses 30 of the milling cutters 26 are arranged at the same axial height in the direction of the rotational axis of the tool C. Such positioning of a bevel edge S by means of the V-shaped recesses 30 in the milling cutters 26 is shown in FIG. 8. The movements of the combination tool 10 and the spectacle lens L about the rotational axis of the tool C and the rotational axis of the workpiece B, respectively, and in the X-direction takes place as described with reference to FIG. 7. As explained at the beginning, if the bevel edge S is to be formed at different height positions on the edge R of the spectacle lens L, the combination tool 10 is simultaneously inter alia dependent upon the angle of rotation $\Phi_B$ of the spectacle lens L moved upwards or downwards in the Z-axis with position control parallel to the holding shafts 14, 16 in FIG. 8.

Figure 9:
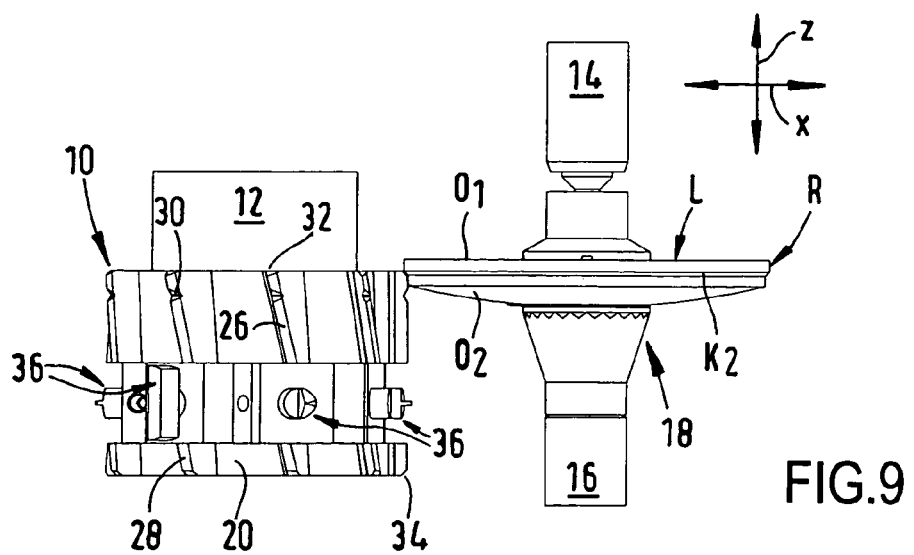
Figure 10:
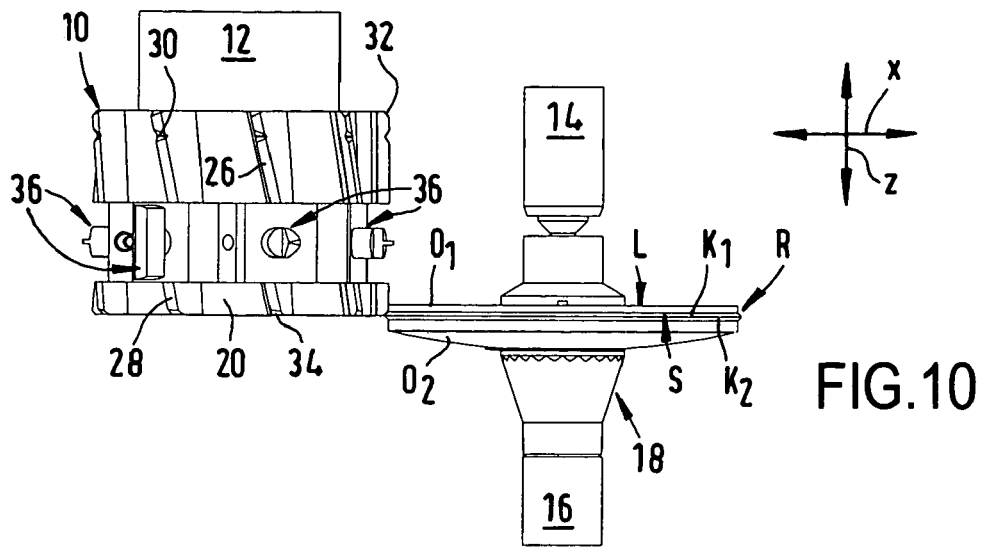
Figure 11:
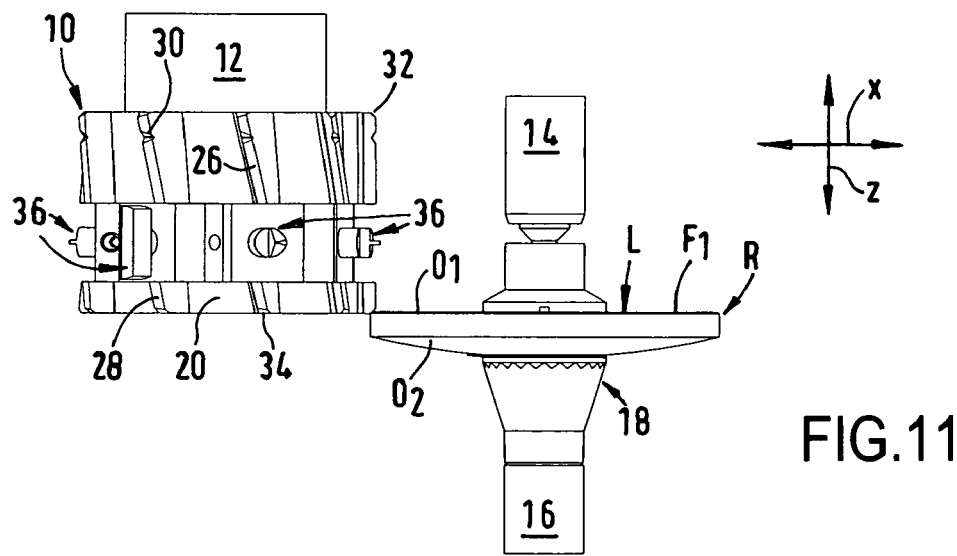
Figure 12:
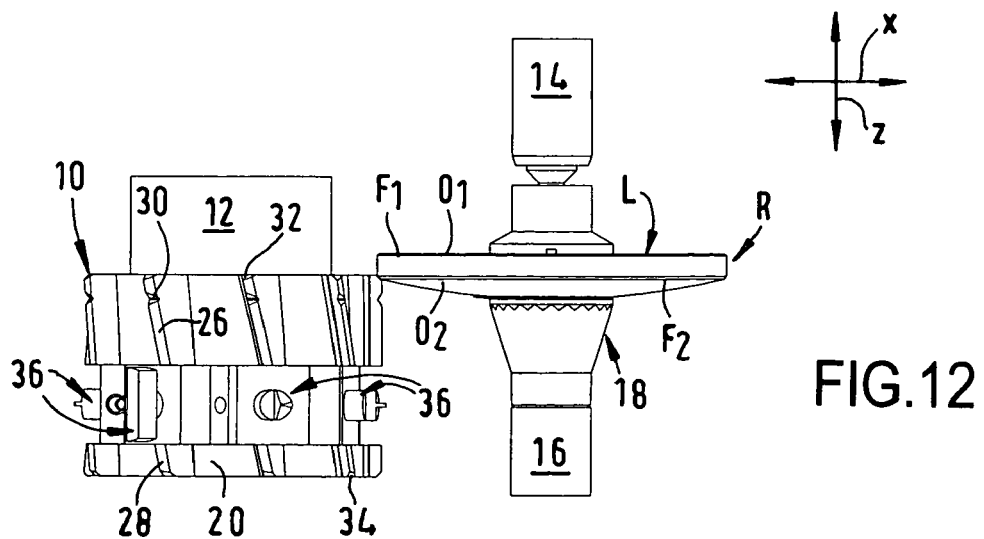

In addition, the upper milling cutters 26 in FIGS. 1 and 2 each have a chamfer 32 at their upper end while the lower milling cutters 28 shown in FIGS. 1 and 2 have a chamfer 34 at their lower end. Looking in the direction of the rotational axis of the tool C, the chamfers 32, 34 are each arranged at the same axial height and form an angle of, for example, 135° with the remaining cutting edge of the milling cutters 26 or 28 when viewed in projection. These chamfers may be used on the one hand to form the flanks $K_1$, $K_2$ of a bevel edge S according to FIG. 30 on the edge R of the lens L, as illustrated in FIGS. 9 and 10, whereby first (FIG. 9) one flank $K_2$ of the bevel edge S is formed by the chamfers 32 on one end, ie the upper end in FIG. 9, of the milling cutters 26 and then (FIG. 10) the other flank $K_1$ of the bevel edge S is formed by the chamfers 34 on the opposite end, ie the lower end in FIG. 10, of the milling cutters 28. On the other hand, it is possible to use the chamfers 32, 34 of the milling cutters 26, 28 to create protective chamfers $F_1$, $F_2$ on the edge R of the spectacle lens L in accordance with FIG. 32. This is shown in FIGS. 11 and 12. With the machining options according to FIGS. 9 to 12, the movements of the combination tool 10 and spectacle lens L about the rotational axis of the tool C and the rotational axis of the workpiece B, respectively, and in the X-direction and optionally the Z-direction are performed as described with reference to FIGS. 7 and 8. Although the bevel edge S at the edge R of the spectacle lens L may be formed more quickly with V-shaped recesses 30 of the milling cutters 26 than they can with the chamfers 32, 34, the latter have inter alia the advantage that in the event of wear they are easier to rework than the V-shaped recesses 30. In addition, when the bevel edge S is created by means of the chamfers 32, 34 of the milling cutters 26, 28, when viewed in the Z-direction, the bevel edge S is always only machined in a geometry-forming way from one side. Unlike the case with simultaneous bilateral machining by means of the V-shaped recesses 30, therefore, the combination tool 10 may be moved away from the machined flank $K_1$ or $K_2$ of the bevel edge S without simultaneously changing anything on the other flank $K_2$ or $K_1$. In particular when, in a circumferential view of the spectacle lens L, the height profile of the bevel edge S changes or should change significantly, this circumstance may be used with the position control of the combination tool 10 in the Z-axis to generate a bevel edge geometry corresponding more exactly to the specifications than a bevel edge geometry created with the V-shaped recesses 30.

As demonstrated in particular by FIGS. 1 to 4, at least one lathe tool 36 is provided on the base body 20, in the embodiment shown there is a plurality of lathe tools 36 that are axially displaced in the direction of the rotational axis of the tool C relative to the milling cutters 26, 28 or to be more precise are arranged axially between the upper milling cutters 26 and the lower milling cutters 28. As will be explained in more detail in the following, the lathe tools 36 have a cutter geometry by means of which the spectacle lens L may be finish-machined at the edge R in such a way that, viewed in section, the spectacle lens L is provided in particular with a prespecified edge geometry corresponding to the intended means of securing it to the holder with, for example, a bevel edge S or a groove N, and/or provided with a protective chamfer $F_1$, $F_2$ at the transition to one or both optically effective surfaces $O_1$, $O_2$, and/or is polished. The axial displacement of the lathe tools 36 relative to the milling cutters 26, 28 means that the lathe tools 36 may also protrude radially outside the cutting circle defined by the milling cutters 26, 28, which is indicated in FIG. 4 by the dotted line at 38, without interfering with the milling machining of the edge R of the spectacle lens L.

Since in the embodiment shown, several lathe tools 36 are provided on one and the same combination tool 10, lathe tools 36 differing from each other may be used which—as will be explained in greater detail below—as far as their geometry and/or the milling material—for example hard metal with or without an wear-resistant coating or even POD, CVD or natural diamond for the polishing of the edge R by means of the lathe tool 36—are concerned are individually adapted to the edge geometry to be created and/or the desired surface quality and/or to the material of the spectacle lens L to be machined, so that there is no need to change the combination tool 10 even for machining spectacle lenses L with different edge geometries, desired surface qualities or materials. The uniform distribution of the lathe tools 36 on the circumference of the base body 20 envisaged in this embodiment has the advantage that due to the lathe tools 36, very little or no unbalance occurs such as could be detrimental to the surface quality of the edge surface created when the combination tool 10 is used for milling.

Although, in principle, it is possible to form the at least one lathe tool in one piece with the base body, for example to solder it to the base body like the milling cutters, preferred is the design of the combination tool 10 shown here with which the lathe tool 36 is secured detachably to the base body 20. To be precise, this advantageously permits the replacement of individual lathe tools 36 or their temporary separation from the combination tool 10 for reworking. For this purpose, introduced in the base body 20 as shown in FIGS. 3 and 4 is a plurality of, in the embodiment shown, six, blind holes 40 each with a suitable, for example circular, hole section, which when viewed in section according to FIG. 4, run in a radial direction, ie in the direction of the rotational axis of the tool C, and which, when viewed in longitudinal section according to FIG. 3, run under an angle of 90° relative to the rotational axis of the tool C. The blind holes 40 which, as already mentioned, have uniform angular spacing from each other, are used for the positive accommodation of a metallic shaft 42 of a lathe tool 36. For this purpose, the shaft 42 of the lathe tool 36 has a cross section that is substantially complementary to the cross section of the blind hole 40. The end of the shaft 42 of the lathe tool 36 in question accommodated in the allocated blind hole 40 lies on the base of the allocated blind hole 40 and is secured detachably in this position by a grub screw 44, which for this is screwed into an allocated threaded hole 46 in the base body 20 from where it extends into a recess 48 formed in the shaft 42. The threaded holes 46 lie in a common plane running perpendicular to the rotational axis of the tool C and extend under an angle of 90° to the blind hole 40 allocated in each case. It is evident that in this way the lathe tools 36 may be fixed to the base body 20 in a tension-proof and compression-resistant way and protected against torsion.

The lathe tools 36 shown in FIGS. 1 to 19 have been selected from a group comprising the following lathe tools 36, whereby is should be noted in advance that the lathe tools 36 described may be combined with each other on a combination tool 10 as desired according to the machining requirements.

(A) lathe tools 36 with a lathe cutter with a width b that is greater than a maximum edge thickness of the spectacle lens L machined or to be machined therewith. A lathe tool 36 of this type with a straight, lathe cutter running parallel to the rotational axis of the tool C is shown in operation in FIG. 13 and may be used to perform the preliminary machining of the edge R of the spectacle lens L by means of a lathe tool. However, here it is preferable that the preliminary machining of the edge R of the lens L be performed by means of the milling cutters 26 of the combination tool 10 since this achieves a greater removal of material in a shorter time without the risk of swarf formation possibly affecting the machining quality. Insofar, the lathe tools 36 in question here are primarily used with an edge shape of the spectacle lens L according to FIG. 29 to polish the edge R for which the lathe tool 36 in particular has a specific cutter geometry that will be described in more detail in the following with reference to FIGS. 5 and 6. With this machining, the position control of the combination tool 10 in the X-axis is performed in dependence on the angle of rotation $\phi_B$ of the spectacle lens L, as described with reference to FIG. 7, but with different feed rates. The swivel movement of the combination tool 10 about the rotational axis of the tool C will be further described with reference to FIG. 20; the same applies to the lathe tools 36 described in the following.

(B) lathe tools 36 whose lathe cutter preferably has a central V-shaped recess 50 used to form a bevel edge S on the edge R of the spectacle lens L as shown in FIG. 30. A lathe tool 36 of this kind with an otherwise straight lathe cutter running parallel to the rotational axis of the tool C is shown in operational use in FIG. 14. It is evident that with a lathe tool 36 of this kind, the two flanks $K_1$, $K_2$ of the bevel edge S may be created in one pass. Here, the position control of the combination tool 10 in the X-axis and optionally the Z-axis is performed in dependence on the angle of rotation $\phi_B$ of the spectacle lens L as described with reference to FIG. 8.

(C) lathe tools 36 whose lathe cutter has on at least one end a chamfer 52, 54 for the formation of a flank $K_1$, $K_2$ of a bevel edge S (see FIG. 30) on the edge R of the spectacle lens L and/or for the creation of a protective chamfer $F_1$, $F_2$ (see FIG. 32) at the edge R of the spectacle lens L. FIGS. 15 and 16 show a lathe tool 36 of this kind with an otherwise straight lathe cutter running parallel to the rotational axis of the tool C in operation whereby, however, only the formation of one bevel edge S is illustrated. Accordingly, first one flank $K_2$ of the bevel edge S is formed by the chamfer 52 on the upper end of the lathe cutter in FIG. 15 and then the other flank $K_1$ of the bevel edge S is formed by the chamfer 54 at the other end, ie the lower end in FIG. 16, of the lathe cutter. Here, the combination tool 10 is position-controlled in dependence on the angle of rotation $\phi_B$ of the spectacle lens L according to the desired circumferential contour U of the machined spectacle lens L in the X-axis and, where necessary, according to the desired height profile of the bevel edge S or the protective chamfers $F_1$, $F_2$ on or at the edge R of the spectacle lens L in the Z-axis.

(D) lathe tools 36 whose lathe cutters have a width b less than or greater than the width of a slot or groove N to be created at the edge R of the spectacle lens L as depicted in FIG. 31. A lathe tool 36 of this kind whose lathe cutter preferably has a cutting edge with a complementary shape to the desired cross section of the groove N to be formed in the edge R of the spectacle lens L is shown inter alia in operation in FIG. 19. Once again, during this fine- or finish-machining step the combination tool 10 is position-controlled in dependence on the angle of rotation $\phi_B$ of the spectacle lens L according to the desired circumferential contour U of the machined spectacle lens L and the desired depth of the groove N in the X-axis and, where necessary, according to the desired height profile of the groove N at the edge R of the spectacle lens L in the Z-axis.

Figure 17:
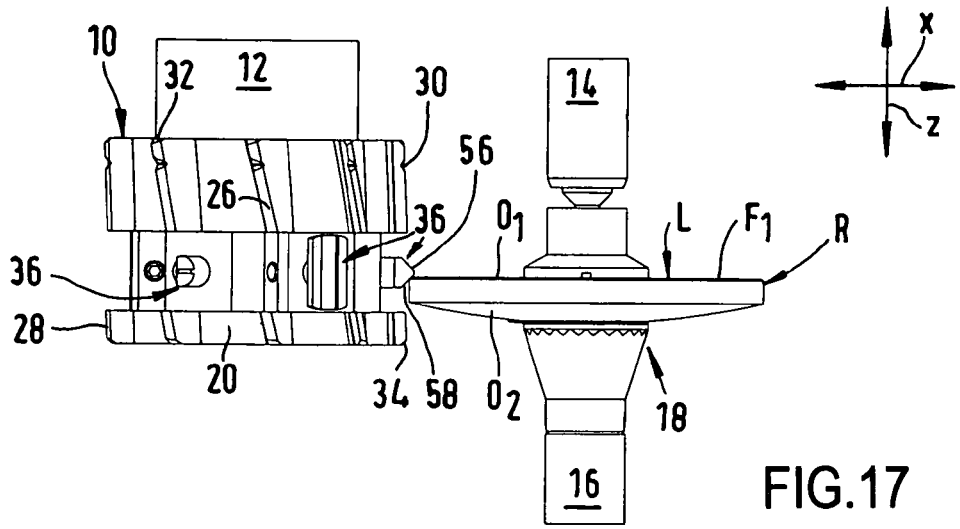
Figure 18:
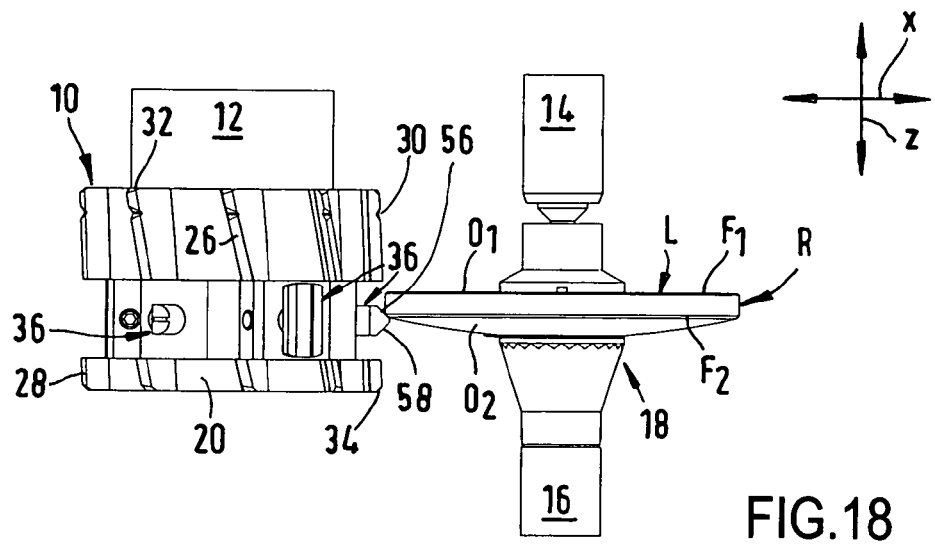
Figure 19:
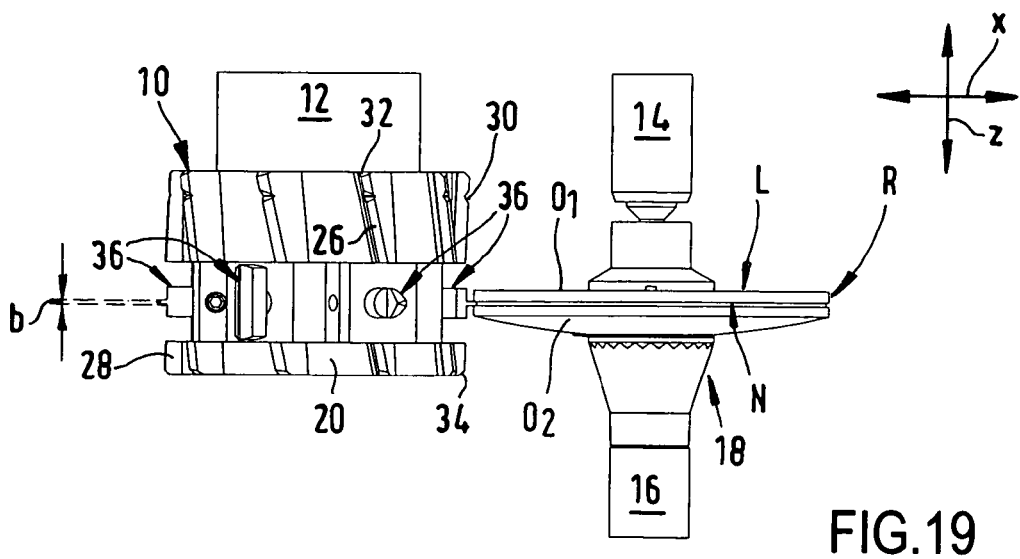

(E) lathe tools 36 whose lathe cutter has, for the creation of protective chamfers $F_1$, $F_2$ (see FIG. 32) on the edge R of the spectacle lens L two adjoining straight cutting areas 56, 58 forming a prespecified angle with each other. FIGS. 17 and 18 show a lathe tool 36 of this kind in operation whereby the cutting areas 56, 58 may be formed in specular symmetry in relation to a plane running perpendicular to the rotational axis of the tool C and form an angle of, for example, 90° with each other. Accordingly, first one protective chamfer $F_1$ is formed by the cutting area 58 on the lower side of the cutter in FIG. 17 and then the other protective chamfer $F_2$ is formed by the cutting area 56 on the other, ie the upper side of the cutter in FIG. 18. Here, the combination tool 10 is position-controlled in dependence upon the angle of rotation $\phi_B$ of the spectacle lens L according to the desired circumferential contour U of the machined spectacle lens L and the desired width of the protective chamfers $F_1$, $F_2$ in the X-axis and, where required, according to the height profile of the edge R of the spectacle lens L in the Z-axis.

(F) lathe tools 36 for polishing the edge R of a spectacle lens L made of a relatively soft plastic such as polycarbonate which according to FIG. 6 may have a negative rake angle γ, which may be up to −15° and/or whose area 62 of the free surface 64 adjoining the face 60 according to FIGS. 5 and 6 has a clearance angle α equal or approximately equal to zero before subsequently optionally assuming a positive value. Whereas the above describes measures on the lathe cutters of the lathe tools 36 according to (A) to (F) that take place in a plane which contains the rotational axis of the tool C of the combination tool 10 in order by means of (fine) lathe machining to influence the macrogeometry of the edge R of the spectacle lens L according to FIGS. 29 to 32, FIGS. 5 and 6 show measures on the cutter geometry of the lathe tool 36 in a plane perpendicular to the rotational axis of the tool C by means of which influence may be exerted by means of fine machining on the microgeometry of the edge R of the spectacle lens L, ie on the surface quality of the edge R or parts thereof.

The described design of the clearance angle α in the area 62 of the free surface 64 adjoining the cutting edge of the lathe tool 36 or the rake angle γ of the face 60 achieves two different effects which may also be used independently of each other according to the requirements in question, ie although not shown in FIGS. 5 and 6, the cutter geometry of the lathe tool 36 may also be selected in such a way that only the rake angle γ has a negative angle while the clearance angle α is much higher than zero at each point of the free surface 64. With a negative value for the rake angle γ (see FIG. 6), during the (fine) lathe machining the cutting edge of the tool 36 is so-to-speak pulled over the machined edge R of the spectacle lens L whereby the cutting edge pushes away the lens material rather than cutting it as in the case with a positive rake angle γ. As a result, there is a plastic (cold) deformation of the lens material during which the surface roughness is smoothed.

If the clearance angle α in the area 62 of the free surface 64 adjoining the face 60 is equal to zero or approximately zero (see FIGS. 5 and 6), the (fine) lathe machining results in the "compression" of the free surface area 62 against the edge R of the spectacle lens L. As a result of the friction between the free surface area 62 and the edge R of the spectacle lens L moved relative thereto, depending upon inter alia the relative speed in the circumferential direction, the feed rate of the combination tool 10 in the X-axis, the material used for the cutter of the lathe tool 36 and the spectacle lens L and the lubricating conditions—heat is introduced into the edge R with said heat resulting in the plastification or softening of the lens material at the edge R which in turn results in the smoothing of the edge surface.

It is evident to the person skilled in the art that, where technically expedient, it must also be possible to combine the measures taken on the lathe tools 36 according to (A) to (F) with each other. In particular, the lathe tools 36 according to (A) to (E) may also have a cutter geometry according to (F).

As a supplement to FIGS. 5, 6 and 13 to 19, FIG. 20 illustrates the superposed movements of the lathe tool 36 in the combination tool 10 about the rotational axis of the tool C and in the X-axis during the (fine) lathe machining of the edge R of a spectacle lens L with a rectangular circumferential contour U. By means of regulation in the C-axis, before the (fine) lathe machining of the edge R of the spectacle lens L, the combination tool 10 is first swivelled about the rotational axis of the tool C in such a way that the lathe tool or, in the case of several lathe tools 36, one specific lathe tool 36, optionally with the radial adjustment of the combination tool 10 relative to the rotational axis of the workpiece B, ie possible position control in the X-axis, is subsequently brought into contact with the edge R of the spectacle lens L in a prespecified relative position between the lathe tool 36 and edge R in which the face 60 of the lathe tool 36 forms a prespecified angle with a tangent T applied at the edge R at the point of contact with the lathe tool 36. In this way, a defined lathe machining engagement is achieved between the lathe tool 36 and the edge R of the lens.

If, as in the example shown here, the circumferential contour U of the spectacle lens L deviates from the circular, during the (fine) lathe machining of the edge R of the lens L which rotates with a controlled angle of rotation $\phi_B$, the combination tool 10 which is moved or adjusted in a suitable radial manner, ie in the X-axis relative to the rotational axis of the workpiece B, is swivelled, with the angle of rotation $\phi_C$ being controlled depending upon the angle of rotation $\phi_B$ and the radius $r_B(\phi_B)$ to be created of the spectacle lens L—$\phi_C = f[\phi_B, r_B(\phi_B)]$—about the rotational axis of the tool C in such a way that the prespecified angle between the face 60 of the lathe tool 36 and the tangent T at the point of contact between the lathe tool 36 and the edge R substantially remains constant in order to maintain the defined lathe machining engagement between the lathe tool 36 and the edge R of the lens to achieve the desired machining results. Therefore, this is a CNC-controlled, continuous tracking of the lathe cutter of the lathe tool 36 whereby, as FIG. 20 shows, there may also be a reversal of the direction of the swivel movement of the combination tool 10 about the rotational axis of the tool C.

It is evident from the above description that the proposed combination tool 10 performs the preliminary machining of the edge R of the spectacle lens L in particular by means of the milling cutters 26, 28 in the combination tool 10 rotating at a controlled rotational speed $n_c$ about the rotational axis of the tool C before the finish-machining of the edge R of the spectacle lens L takes place in particular by means of one or more lathe tools 36 provided on the combination tool 10, under a swivel movement with a controlled angle of rotation $\phi_C$ of the combination tool 10 about the rotational axis of the tool C. Hereby, before the preliminary machining of the edge R and/or between the preliminary machining and the finish-machining of the edge R, expediently, the edge R of the spectacle lens L is measured with regard to radius values $r_B(\phi_B)$ and optionally height values $z_B(\phi_B)$ (see FIGS. 29 to 32) following which the preliminary machining or finish-machining of the edge R is performed taking into account the measured values $r_B(\phi_B)$, $z_B(\phi_B)$. With regard to a suitable measuring method, here express reference is made to applicant's DE 101 19 662 A1.

The following describes the second to fifth embodiments of the combination tool 10 with reference to FIGS. 21 to 28 only insofar as they differ from the first embodiment whereby the same reference numbers identify the same or equivalent components or parts.

The second embodiment of the combination tool 10 shown in FIGS. 21 and 22 only differs from the first embodiment with regard to the design of the milling cutters 66, 68. Although like the first embodiment, said milling cutters have a slightly curved shape, here—in each case seen in a plan view looking in a direction perpendicular to the rotational axis of the tool C—they are not uniformly inclined in relation to the rotational axis of the tool C. On the contrary, the milling cutters 66, 68 are arranged with two different inclinations in one direction, namely towards the left in FIG. 22, alternately on the circumference of the base body 20. Compared to the milling cutters 26, 28 in the first embodiment, the different inclinations or pitches of the milling cutters 66, 68 result in yet lower process forces and even greater reduction in swarf formation which has a positive effect on the surface quality of the machined edge R of the spectacle lens L.

In the third embodiment according to FIGS. 23 and 24, the combination tool 10 has only one milling section which is arranged axially displaced in relation to the lathe tool 36. Here, the milling section has a plurality of milling cutters 70 of which, as shown in a rather schematic way in FIGS. 23 and 24, in the circumferential direction adjacent milling cutters 70 run inclined relative to the rotational axis of the tool C in opposite directions, ie once to the left and once to the right and the oppositely inclined milling cutters 70 are arranged alternately on the circumference of the base body 20. As a result of this arrangement, the milling cutters 70 form a cross-shaped structure on the base body 20 which is left and right-cutting. Compared to the first and second embodiments, this results in even lower process forces and even more greatly reduced swarf formation on both sides. Once again, the inclination of the milling cutters 70 achieves a reduction in the impact effect of the individual milling cutter 70 and hence the reduced induction of vibrations during the milling. In addition, the still existent radial eccentricity of the combination tool 10 does not take full effect. Similarly, as with the first and second embodiments, according to the machining requirements in question, the V-shaped recesses 30 and/or the chamfers 32, 34 on the milling cutters 26, 28 or 66, 68 may also be omitted, and, if necessary, the milling section in the third embodiment may also have V-shaped recesses and/or terminal chamfers.

FIGS. 25 and 26 illustrate with reference to a fourth embodiment of the combination tool 10 a greatly simplified design of the milling section compared to the first to third embodiments in which the milling cutters 72 run parallel to the rotational axis of the tool C. Milling cutters 72 of this kind, which optionally may have a V-shaped recess and/or terminal chamfers in accordance with the first and second embodiments, are particularly simple to produce and rework.

Finally, with the fifth embodiment of the combination tool 10 according to FIGS. 27 and 28, the lathe tools 36 are arranged at the axial height of the milling cutters 74, which in this embodiment run parallel to the rotational axis of the tool C, in the circumferential direction of the combination tool 10 with a uniform angular distribution between the milling cutters 74, and each have a lathe cutter radially internally displaced relative to the cutting circle 38 of the milling cutters 74. Here, the lathe tools 36 are secured to the base body 20 in a similar way to the securing of the lathe tools 36 described for the first embodiment. This design has the advantage that the combination tool 10 is even shorter than the first to fourth embodiments in the axial direction, ie in the direction of the rotational axis of the tool C. In the fifth embodiment, the milling cutters 74 may again have V-shaped recesses and/or terminal chamfers. Finally, it is also feasible to have an arrangement of the lathe tools 36 of this kind at the axial height of the milling cutters viewed in the circumferential direction between the milling cutters even with the designs of the milling cutters described with reference to the first to third embodiments. Optionally, then one or more sector(s) on the base body 20 would be kept free of milling cutters and the lathe tool(s) 36 would be provided at this/these places.

A device is disclosed for edge-machining in particular plastic spectacle lenses with two aligned holding shafts rotatable with a controlled angle of rotation $\phi_B$ about a rotational axis of a workpiece B between which the lens may be clamped and a tool spindle by means of which a combination tool may be driven rotationally about a rotational axis of a tool C running parallel to the rotational axis of the workpiece B. The holding shafts and the tool spindle may be moved with position control towards each other in a first axial direction X and optionally parallel to each other in a second axial direction Z perpendicular to the first axial direction X. According to the invention, for a lathe machining of the edge R of the lens, the combination tool can be swivelled with a controlled angle of rotation $\phi_C$ about the rotational axis of the tool C by means of the tool spindle so that a lathe tool provided on the combination tool may be brought into a defined lathe machining engagement with the edge R of the lens. The invention also comprises a combined milling and lathe tool and a combined milling and lathe machining method. As a result, the edge of the lens may be machined very flexibly, quickly and with a high machining quality.

LIST OF REFERENCE SIGNS

10 Combination tool
12 Tool spindle
14 Holding shaft
16 Holding shaft
18 Arrangement for blocking and clamping 20 Base body
22 Cylinder surface
24 Expansion arbor
28 Milling cutter
26 Milling cutter
28 V-shaped recess
32 Chamfer
34 Chamfer
36 Turning tool
38 Cutting circle
40 Blind hole
42 Shaft
44 Grub screw
46 Threaded hole
48 Recess
50 V-shaped recess
52 Chamfer
54 Chamfer
56 Cutting area
58 Cutting area
60 Face
62 Free surface area
64 Free surface
66 Milling cutter
68 Milling cutter
70 Milling cutters
72 Milling cutter
74 Milling cutter
b Width of turning tool
$r_B$ Edge radius
$z_B$ Height of edge
α Clearance angle
γ Rake angle
$\Phi_B$ Rotational angle of lens
$\Phi_C$ Rotational angle of tool
B Rotational axis of workpiece
C Rotational axis of tool
$F_1$, $F_2$ Protective chamfer
$K_1$, $K_2$ Flank
L Spectacle lens
N Groove
$O_1$, $O_2$ Optically effective surface
R Edge
S Bevel edge
U Circumferential contour
X Linear axis
Z Linear axis

The invention claimed is:

1. Method for the edge-machining of an optical lens (L), namely a plastic spectacle lens rotatable with a controlled angle of rotation ($\phi_B$) about a rotational axis of a workpiece (B) with the following steps:
   preliminary machining of the edge (R) of the lens (L) by means of at least one combination tool (10) adjustable at least radially relative to the rotational axis of the workpiece (B) and rotatable about a rotational axis of a tool (C) whereby, seen in plan view, the lens (L) is given a circumferential contour (U) that corresponds to a circumferential contour of a holder for the lens (L) apart from a slight degree of oversizing if necessary and
   finish-machining of the edge (R) of the lens (L) by means of the combination tool (10) whereby the edge (R) of the lens (L) is provided, when viewed in cross section, with a prespecified edge geometry corresponding to its intended means of fastening to the holder, optionally with a protective chamfer ($F_1$, $F_2$) at the transition to one or both optically effective surfaces ($O_1$, $O_2$) and optionally polished;
   characterised in that the preliminary machining of the edge (R) and the finish-machining of the edge (R) is performed by means of a combination tool (10) comprising both milling cutters (26, 28, 66, 68, 70, 72, 74) and at least one lathe tool (36) with said combination tool being rotated at a controlled rotational speed ($n_c$) about the rotational axis of the tool (C) during a milling machining of the edge (R), and being swivelled with a controlled angle of rotation ($\phi_C$) about the rotational axis of the tool (C) before and optionally also during the lathe machining of the edge (R).

2. Method according to claim 1, characterised in that, before the lathe machining of the edge (R) of the lens (L), the combination tool (10) is swivelled with a controlled angle of rotation ($\phi_C$) about the rotational axis of the tool (C) in such a way that the lathe tool (36) optionally with radial adjustment of the combination tool (10) relative to the rotational axis of the workpiece (B), is subsequently brought into contact with the edge (R) in a prespecified relative position between the lathe tool (36) and edge (R) at which the face (60) of the lathe tool (36) forms a prespecified angle with a tangent (T) applied to the edge (R) at the point of contact with the lathe tool (36).

3. Method according to claim 2, characterised in that the combination tool (10) suitably radially adjusted relative to the rotational axis of the workpiece (B) during lathe machining on the edge (R) of a rotating lens (L) which is to be given a circumferential contour (U) deviating from the circular, is swivelled or tracked about the rotational axis of the tool (C) in dependence on the angle of rotation ($\phi_B$) and on the radius to be created ($r_B(\phi_B)$) of the lens (L) with a controlled angle of rotation ($\phi_C=f[\phi_B, r_B(\phi_B)]$) in such a way that the prespecified angle between the face (60) of the lathe tool (36) and the tangent (T) at the point of contact between the lathe tool (36) and edge (R) substantially remains constant.

4. Method according to claim 1, characterised in that the preliminary machining of the edge (R) of the lens (L) is performed by means of the milling cutters (26, 28, 66, 68, 70, 72, 74) of the combination tool (10) (FIG. 7).

5. Method according to claim 1, characterised in that during the finish-machining of the edge (R) of the lens (L), a bevel edge (S) with two flanks ($K_1$, $K_2$) is created by means of the milling cutters (26, 28, 66, 68) of the combination tool (10) (FIGS. 9, 10) which have terminal chamfers (32, 34) provided therefor whereby first one flank ($K_2$) of the bevel edge (S) is formed by the chamfers (32) at one end of the milling cutters and then the other flank ($K_1$) of the bevel edge (S) is formed by the chamfers (34) at the opposite end of the milling cutters.

6. Method according to claim 1, characterised in that during the finish-machining of the edge (R) of the lens (L), a bevel edge (S) with two flanks ($K_1$, $K_2$) is created by means of a lathe tool (36) of the combination tool (10) (FIG. 14) for which its lathe cutter has a V-shaped recess (50).

7. Method according to claim 1, characterised in that during the finish-machining of the edge (R) of the lens (L) a bevel edge (S) with two flanks ($K_1$, $K_2$) is created by means of a lathe tool (36) of the combination tool (10) (FIGS. 15, 16) for which its lathe cutter has a chamfer (52, 54) at each end whereby first one flank ($K_2$) of the bevel edge (S) is formed by the chamfer (52) at one end of the lathe cutter and then the other flank ($K_1$) of the bevel edge (S) is formed by the chamfer (54) at the opposite end of the lathe cutter.

8. Method according to claim 1, characterised in that during the finish-machining of the edge (R) of the lens (L) a groove (N) is formed on the edge (R) by means of a lathe tool (36) of the combination tool (10) (FIG. 19) whose lathe cutter has a width (b) less than or equal to the width of the groove (N) to be created.

9. Method according to claim 1, characterised in that during the finish-machining of the edge (R) of the lens (L) a protective chamfer ($F_1$, $F_2$) is created on the edge (R) at the transition to at least one of the two optically effective surfaces ($O_1$, $O_2$) by means of a lathe tool (36) of the combination tool (10) whose lathe cutter has a chamfer (52, 54) at least at one end or has two adjoining straight cutting areas (56, 58) (FIGS. 17, 18) forming a prespecified angle with each other.

10. Method according to claim 1, characterised in that during the finish-machining of the edge (R) of the lens (L), which is comprised of a relatively soft plastic such as polycarbonate, at least one part of the edge (R) is polished by means of a lathe tool (36) with a negative rake angle ($\gamma$) (FIG. 6) and/or whose area (62) of the free surface (64) adjoining the face (60) has a clearance angle ($\alpha$) equal to zero or approximately zero (FIGS. 5, 6).

11. Method according to claim 1, characterised in that the edge (R) of the lens (L) is measured before the preliminary machining of the edge (R) and/or between the preliminary machining and the finish-machining of the edge (R) with regard to radius values ($r_B(\phi_B)$) and optionally height values ($z_B(\phi_B)$), and the preliminary machining or finish-machining of the edge (R) is performed taking into account the measured values ($r_B(\phi_B)$, $z_B(\phi_B)$).

12. Combination tool (10) for the edge-machining of an optical lens (L) namely a plastic spectacle lens, for the performance of the method according to one of the preceding claims, with a base body (20) on which a plurality of milling cutters (26, 28, 66, 68, 70, 72, 74) is provided which, when the combination tool (10) is rotated about a rotational axis of a tool (C), define a cutting circle (38) and by means of which the edge (R) of the lens (L) is preliminarily machined in such a way that, seen in plan view, the lens (L) is provided with a circumferential contour (U) which corresponds to a circumferential contour of a holder for the lens apart from a slight degree of oversizing if necessary, characterised in that on the base body (20) also at least one lathe tool (36) is provided which, in the direction of the rotational axis of the tool (C), is arranged axially displaced relative to the milling cutters (26, 28, 66, 68, 70, 72), or is arranged at the axial height of the milling cutters (74) in the circumferential direction of the combination tool (10) between the milling cutters (74) with a lathe cutter radially internally offset relative to the cutting circle (38) of the milling cutters (74), whereby the lathe tool (36) has a cutter geometry by means of which the lens (L) on the edge (R) is finish-machined in such a way that viewed in section, the lens (L) on the edge (R) has a prespecified edge geometry and/or is provided with a protective chamfer ($F_1$, $F_2$) at the transition to one or both optically effective surfaces ($O_1$, $O_2$) and/or is polished.

13. Combination tool (10) according to claim 12, characterised in that the lathe tool (36) is selected from a group comprising the following lathe tools (36):
  lathe tools (36) whose lathe cutter has a width (b) (FIG. 13) that is greater than a maximum edge thickness of the lens (L) which is to be machined or the lens (L) which has been machined thereby,
  lathe tools (36) whose lathe cutter has a V-shaped recess (50) for the formation of a bevel edge (S) on the edge (R) of the lens (L) (FIG. 14), lathe tools (36) whose lathe cutter has on at least one end a chamfer (52, 54) for the formation of a flank ($K_1$, $K_2$) of a bevel edge (S) on the edge (R) of the lens (L) (FIGS. 15, 16) and/or for the creation of a protective chamfer ($F_1$, $F_2$) on the edge (R) of the lens (L),
  lathe tools (36) whose lathe cutter has a width (b) that is less than or equal to the width of a groove (N) to be created on the edge (R) of the lens (L) (FIG. 19),
  lathe tools (36) whose lathe cutter has, for the creation of protective chamfers ($F_1$, $F_2$) on the edge (R) of the lens (L), two adjoining straight cutting areas (56, 58) forming a prespecified angle with each other (FIGS. 17, 18), and
  lathe tools (36) for polishing the edge (R) of a lens (L) which is comprised of a relatively soft plastic such as polycarbonate, which lathe tools (36) have a negative rake angle ($\gamma$) (FIG. 6) and/or whose area (62) of the free surface (64) adjoining the face (60) has a clearance angle ($\alpha$) that is equal to zero or approximately zero (FIGS. 5, 6).

14. Combination tool (10) according to claim 12, characterised in that provided on the base body (20) are several lathe tools (36) which are substantially uniformly distributed over the circumference of the base body (20).

15. Combination tool (10) according to claim 12, characterised in that the lathe tool (36) is secured detachably to the base body (20).

16. Combination tool (10) according to claim 12, characterised in that the milling cutters (26, 28, 66, 68, 70) seen in plan view looking in a direction perpendicular to the rotational axis of the tool (C) are each inclined relative to the rotational axis of the tool (C).

17. Combination tool (10) according to claim 16, characterised in that in the circumferential direction adjacent milling cutters (70) run in opposite directions inclined relative to the rotational axis of the tool (C) and the opposed inclined milling cutters (70) are arranged alternately on the circumference of the base body (20).

18. Combination tool (10) according to claim 12, characterised in that the milling cutters (26, 28, 66, 68) are each provided with a V-shaped recess (30) to form a bevel edge (S) on the edge (R) of the lens (L) whereby the V-shaped recesses (30) of the milling cutters (26, 28, 66, 68) are arranged at the same axial height in the direction of the rotational axis of the tool (C).

19. Combination tool (10) according to claim 12, characterised in that the milling cutters (26, 28, 66, 68) are each provided on at least one end with a chamfer (32, 34) for the formation of a flank ($K_1$, $K_2$) of a bevel edge (S) on the edge (R) of the lens (L) and/or for the creation of a protective chamfer ($F_1$, $F_2$) on the edge (R) of the lens (L) whereby the chamfers (32, 34) of the milling cutters (26, 28, 66, 68) are arranged at the same axial height in the direction of the rotational axis of the tool (C).

20. Device for the edge-machining of an optical lens (L) namely a plastic spectacle lens for the performance of the method for the edge machining of an optical lens using a combination tool (10) according to claim 12, with two aligned holding shafts (14,16) rotatable with a controlled angle of rotation ($\phi_B$) about a rotational axis of a workpiece (B) between which the lens (L) is clamped, and a tool spindle (12) by means of which the combination tool (10) is driven rotatably about a rotational axis of a tool (C) running substantially parallel to the rotational axis of the workpiece (B) whereby the holding shafts (14, 16) and the tool spindle (12) is moved with position control towards each other in a first axial direction (X) and generally parallel to each other in a second axial direction (Z) perpendicular to the first axial direction (X), characterised in that for the lathe machining of the edge (R) of the lens (L) to be machined, the combination tool (10) is swivelled with a controlled angle of rotation ($\phi_C$) by means of the tool spindle (12) about the rotational axis of the tool (C) so that a lathe tool (36) provided on the combination tool (10) is brought into a defined lathe machining engagement with the edge (R) to be machined.

* * * * *

UNITED STATES PATENT AND TRADEMARK OFFICE
CERTIFICATE OF CORRECTION

PATENT NO. : 7,308,745 B2
APPLICATION NO. : 10/722007
DATED : December 18, 2007
INVENTOR(S) : Jochen Diehl and Steffen Wallendorf It is certified that error appears in the above-identified patent and that said Letters Patent is hereby corrected as shown below:

In the Specification:

Col. 13, Line 46     Delete "(F)", insert --(E)--
Col. 17, Line 4     Delete "28", insert --26--
Col. 17, Line 5     Delete "26", insert --28--
Col. 17, Line 6     Delete "28", insert --30--

Signed and Sealed this

Thirtieth Day of December, 2008

JON W. DUDAS
*Director of the United States Patent and Trademark Office*